United States Patent [19]
Pugh et al.

[11] Patent Number: 6,088,739
[45] Date of Patent: Jul. 11, 2000

[54] METHOD AND SYSTEM FOR DYNAMIC OBJECT CLUSTERING

[75] Inventors: David Pugh, Bellevue; John Eugene Ball, Woodinville, both of Wash.

[73] Assignee: Microsoft Corporation, Redmond, Wash.

[21] Appl. No.: 08/673,443

[22] Filed: Jun. 28, 1996

[51] Int. Cl.[7] .................................................. G06F 9/44
[52] U.S. Cl. ................................. 709/315; 395/500.43
[58] Field of Search ................................ 395/500, 680, 395/683, 500.28–500.49; 364/578; 709/300–305

[56] References Cited

U.S. PATENT DOCUMENTS

| 5,050,074 | 9/1991 | Marca | 364/200 |
|---|---|---|---|
| 5,481,718 | 1/1996 | Ryu et al. | 395/683 |
| 5,710,925 | 1/1998 | Leach et al. | 709/303 |
| 5,737,606 | 4/1998 | Martin et al. | 709/303 |
| 5,764,958 | 6/1998 | Coskun | 395/500 |
| 5,805,885 | 9/1998 | Leach et al. | 395/683 |
| 5,874,954 | 2/1999 | Kilmer et al. | 345/333 |

OTHER PUBLICATIONS

Howard, Duncan, "An Introduction to MUD, Multi–User Dungeon," Century Communications, London, 1985.

*Primary Examiner*—Majid A. Banankhah
*Assistant Examiner*—St. John Courtenay, III
*Attorney, Agent, or Firm*—Michael Dryja

[57] ABSTRACT

A method and system for dynamically modifying the behavior of a statically declared object that represents a simulated entity is provided. In a preferred embodiment, a clustering mechanism is provided that represents each simulated entity as a composite object, which is implemented as a composite object of component objects. The clustering mechanism allows the behavior of the composite object to be dynamically modified by adding interfaces to or removing interfaces from the composite object. Each interface, referred to as a role interface, includes methods that implement the behavior associated with a role that the composite object may assume. The clustering mechanism provides a negotiation procedure for attaching roles to the composite object. The component objects that comprise a composite object include a cluster object and zero or more role objects. The cluster object keeps track of the role objects currently within the composite object and exposes each of the role interfaces of each role object outside the composite object. The cluster object also contains functions for retrieving role interfaces and for invoking a function of an exposed role interface.

14 Claims, 22 Drawing Sheets

METHOD AND SYSTEM FOR DYNAMIC OBJECT CLUSTERING

TECHNICAL FIELD

This invention relates generally to a computer method and system for clustering objects dynamically and, more specifically, to a method and system for providing statically declared objects with dynamic behavior.

BACKGROUND OF THE INVENTION

Object-oriented languages and the computer systems upon which they are implemented generally provide two different paradigms for adding functionality to an existing object. According to the first paradigm, the object-oriented language itself is dynamic. That is, the language is defined such that new methods (functions) can be added to objects on the fly, even after compile time. An example of this kind of object-oriented language is Objective-C. In Objective-C, each method call causes a message to be sent to the object; thus, a new method can be added to an object without requiring recompilation of the object and relinking other objects that desire to invoke the added method. Specifically, in a message-based system, in order for an object to send a message to invoke the new method, the object need only know the identifier of the target object and the name of the new method. However, because each method call involves message passing overhead, such a system is flexible at the cost of being slow.

According to the second paradigm, the object-oriented language provides more static objects, whose functionality is determined at compile time. That is, all of the methods of an object need to be declared at compile time. In objects caused by the earthquake's shock waves based upon the height of each object. The programmer may later create a specific algorithm for simulating how the motion effects differ when objects are located on different types of soil. If the programmer can replace an existing method implementation in the simulation by a new implementation of the same method name (e.g., a "motion" method), then some changes can be made to the model. If, however, the programmer does not want to replace the behavior simulated by the general algorithm but wants to add the soil motion algorithm so that the effects of differing soil can be controlled simultaneously and independently, then such changes are more difficult because the new method (not previously declared) cannot be added easily in a static environment.

The present invention is described below using some object-oriented techniques; thus, an overview of well-known object-oriented programming techniques is provided. Two common characteristics of object-oriented programming languages are support for data encapsulation and data type inheritance. Data encapsulation refers to the binding of functions and data. Inheritance refers to the ability to declare a data type in terms of other data types. In the C++ language, data encapsulation and inheritance are supported through the use of classes. A class is a user-defined type. A class declaration describes the data members and function members of the class. A function member is also referred to as a method of a class. The data members and function members of a class are bound together in that the function operates on an instance of the class. An instance of a class is also called an object of the class. Thus, a class provides a definition for a group of objects with similar properties and common behavior.

To allocate storage for an object of a particular type (class), an object is instantiated. Once instantiated, data can be assigned to the data members of the particular object. Also, once instantiated, the function members of the particular object can be invoked to access and manipulate the data these systems, in order to add new behavior, the declaration for the object must be recompiled. The Component Object Model ("COM") of objects in the OLE 2.01 environment, established by Microsoft Corporation in Redmond, Wash., is an example of the latter paradigm. According to the COM paradigm, each object declares its methods at compile time. Although new implementations of existing methods can be loaded at run time (as long as the method declaration remains constant), new methods cannot be added after compile time. Objects that abide by the COM paradigm are hereafter referred to as "COM objects."

Computer games and other types of simulation environments pose problems for object-oriented systems that support a static environment paradigm, such as OLE 2.01. For example, in an adventure game, a player may search for treasures in a maze and meet up with characters (e.g., an enemy soldier) and other things (e.g., a boulder) that help or hinder the player's progress. Often these characters and other things acquire different behaviors and capabilities based upon certain triggered events or properties. For example, the player might acquire and drink a magic potion, which suddenly enables the player to fly through the maze. These simulation environments typically represent each character or thing as an object stored in memory. Thus, an implementation of such a game would need to dynamically provide the player with flying capabilities after the player object has been instantiated. This behavior is difficult to achieve in an object-oriented environment that only supports the static declaration of object methods.

Similarly, an extended duration simulation project may require changes to the underlying model over time. For example, in a simulation of the effects of an earthquake on a nuclear power plant, a programmer may want to vary the types of motion caused by the earthquake. Specifically, the simulation program may be executing a general algorithm for determining the motion of members. Thus, in this manner, the function members implement the behavior of the object, and the object provides a structure for encapsulating data and behavior into a single entity.

To support the concept of inheritance, classes may be derived from (based upon the declaration of) other classes. A derived class is a class that inherits the characteristics—data members and function members—of its base classes. A class that inherits the characteristics of another class is a derived class. A class that does not inherit the characteristics of another class is a primary (root) class. A class whose characteristics are inherited by another class is a base class. A derived class may inherit the characteristics of several classes; that is, a derived class may have several base classes. This is referred to as multiple inheritance.

A class may also specify whether its function members are virtual. Declaring that a function member is virtual means that the function can be overridden by a function of the same name and type in a derived class. If a virtual function is declared without providing an implementation, then it is referred to as a pure virtual function. A pure virtual function is a virtual function declared with the pure specifier, "=0". If a class specifies a pure virtual function, then any derived class needs to specify an implementation for that function member before that function member may be invoked. A class which contains at least one pure virtual function member is an abstract class.

FIG. 1 is a block diagram illustrating typical data structures used to represent an object. An object is composed of instance data (data members) and function members, which implement the behavior of the object. The data structures used to represent an object comprise instance data structure 101, virtual function table 102, and the function members 103, 104, 105. The instance data structure 101 contains a pointer to the virtual function table 102 and contains data members. The virtual function table 102 contains an entry for each virtual function member defined for the object. Each entry contains a reference to the code that implements the corresponding function member. The layout of this sample object conforms to models described in U.S. Pat. No. 5,297,284, entitled "A Method for Implementing Virtual Functions and Virtual Bases in a Compiler for an Object Oriented Programming Language," which is hereby incorporated by reference. In the following, an object will be described as an instance of a class as defined by the C++ programming language. One skilled in the art would appreciate that other object models can be defined using other programming languages.

An advantage of using object-oriented techniques is that these techniques can be used to facilitate the sharing of objects. For example, a program implementing the function members of an instantiated object (a "server program") can share the object with another program (a "client program"). To allow an object of an arbitrary class to be shared with a client program, interfaces are defined through which an object can be accessed without the need for the client program to have access to the class definitions at compile time. An interface is a named set of logically related function members. In C++, an interface is an abstract class with no data members and whose virtual functions are all pure. Thus, an interface provides a published protocol for two programs to communicate. Interfaces are typically used for derivation: a program defines (implements) classes that provide implementations for the interfaces the classes are derived from. Thereafter, objects are created as instances of these derived classes. Objects instantiated from a derived class implementing particular interfaces are said to "support" the interfaces. An object supports one or more interfaces depending upon the desired functionality.

When a client program desires to share an object, the client program needs access to the code that implements the interfaces for the object (the derived class code). In the OLE 2.01 environment, to access the derived class code (also referred to as class code), each class implementation is given a unique class identifier (a "CLSID"). For example, code implementing a spreadsheet object developed by Microsoft Corporation may have a class identifier of "MSSpreadsheet," while code implementing a spreadsheet object developed by another corporation may have a class identifier of "LTSSpreadsheet." A persistent registry in each computer system is maintained that maps each CLSID to the code that implements the class. Typically, when a spreadsheet program is installed on a computer system, the persistent registry is updated to reflect the availability of that class of spreadsheet objects. So long as a spreadsheet developer implements each function member defined by the interfaces to be supported by spreadsheet objects and so long as the persistent registry is maintained, the client program can access the function members of shared spreadsheet objects without regard to which server program has implemented them or how they have been implemented.

Since an object may support some interfaces and not others, a client program may need to determine at runtime whether a particular object supports a particular interface. To enable this determination, every COM object supports the IUnknown interface, which contains a function member, QueryInterface, that indicates which interfaces are implemented for the object. The QueryInterface method is defined as follows:

virtual HRESULT QueryInterface (REFIID iid, void**ppv)=0;

The QueryInterface method is passed an interface identifier in parameter iid (of type REFIID) and returns in parameter ppv a pointer to the implementation of the designated interface "iid." Thus, the QueryInterface method is typically coded to know about all available interfaces of the object to which it belongs. If the object does not support the interface, then the QueryInterface method returns false. The type HRESULT indicates a predefined status.

The IUnknown interface also defines the methods AddRef and Release, which are used to implement reference counting. Whenever a new reference to an interface is created, the AddRef method is invoked to increment a reference count of the object. When a reference is no longer needed, the Release method is invoked to decrement the reference count of the object and, when the reference count goes to zero, the object is deallocated.

FIG. 2 is a symbolic representation of an object. In the following description, an object data structure is represented by the shape 201 labeled with the interfaces through which the object may be accessed. As shown, object 201 supports IInterface1 and IInterface2.

SUMMARY OF THE INVENTION

The present invention provides a method and system for modifying the behavior of a simulated entity. The clustering mechanism provided by the method and system includes the creation of a composite object to represent the simulated entity. The composite object includes a cluster object, which represents the base characteristics of the simulated entity. The cluster object provides the ability to add a role interface to the composite object (thereby associating the role interface with the composite object) and the ability to retrieve a requested role interface from the composite object. A role interface provides one or more functions (methods) that implement a behavior that can be added to the simulated entity. Once the composite object is created, a role interface can be added by passing to the cluster object a reference to a role interface that implements a behavior to be added to the simulated entity. Further, a requested role interface can be retrieved from the cluster object. Once retrieved, a function of the retrieved role interface can be invoked to perform a modified behavior of the simulated entity.

In other aspects of the invention, the clustering mechanism provides the ability to detach previously attached role interfaces from the composite object, thereby disassociating the previously associated role interfaces.

In yet other aspects, the clustering mechanism provides that a determination can be made of whether to attach a role interface to the composite object before the role is added. This determination is a negotiated procedure between a cluster object and the object that provides the role interface. In certain cases, the determination is based upon characteristics of the cluster object. In other cases, the determination is based upon characteristics of the object that provides the role interface.

The clustering mechanism also provides a role list object and a cluster list object for managing references to role interfaces and to composite objects.

DETAILED DESCRIPTION OF THE INVENTION

Figure 1:
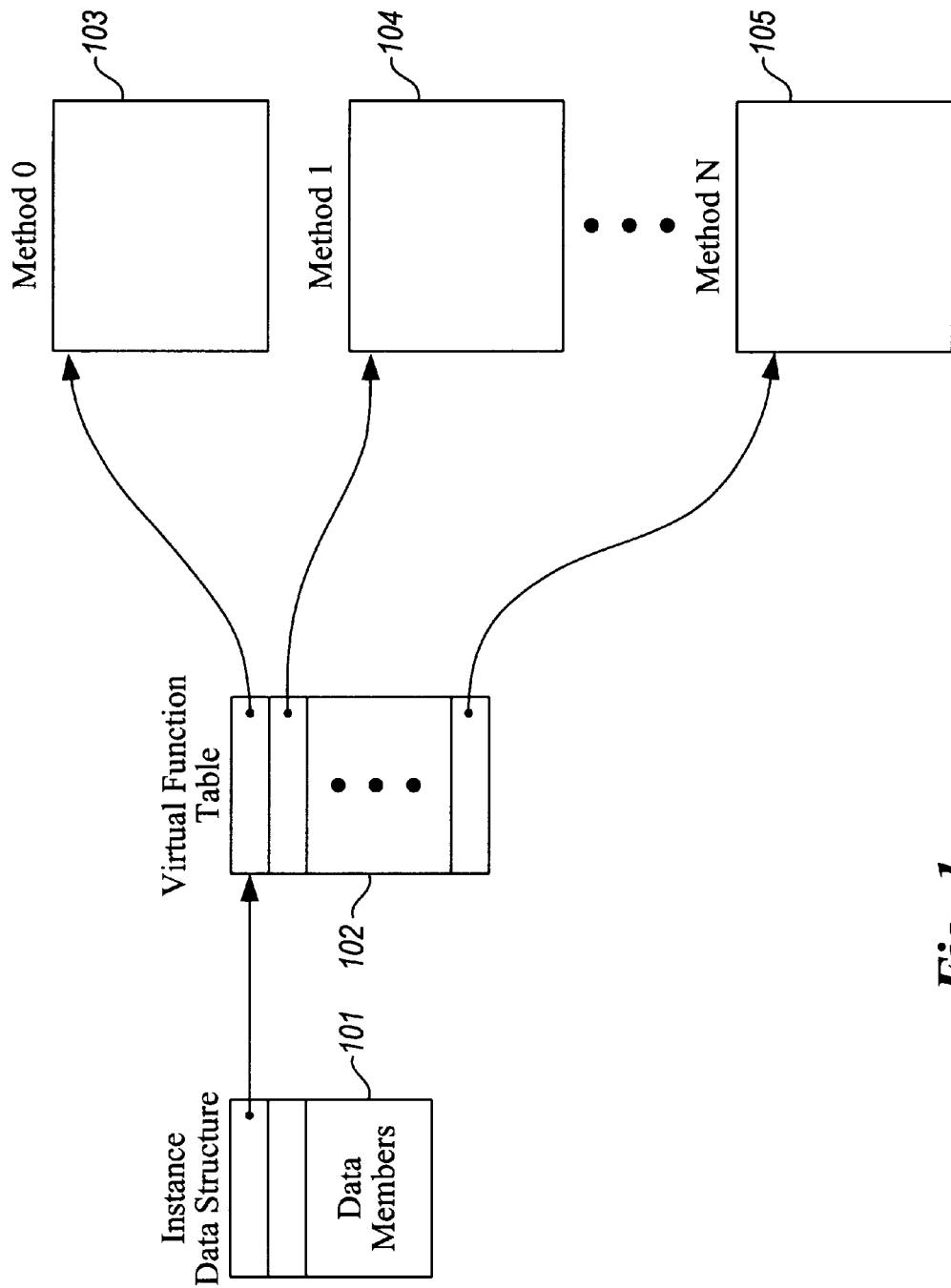
FIG. 1 is a block diagram illustrating typical data structures used to represent an object.
Figure 2:
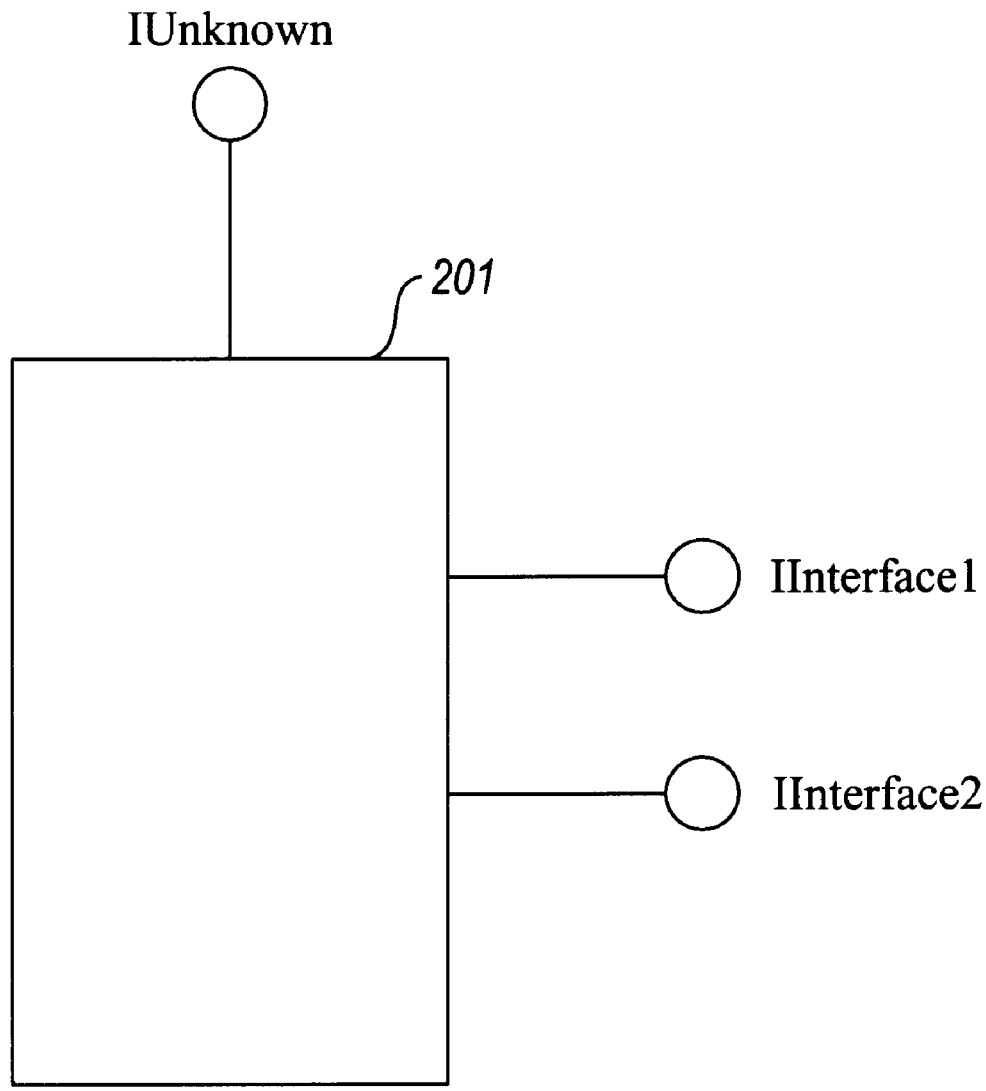
FIG. 2 is a symbolic representation of an object.

In a preferred embodiment, the present invention provides a method and system for dynamically modifying the behavior of a statically declared object that represents a simulated entity. A preferred system of the present invention, referred to as the clustering mechanism, represents each simulated entity as a composite object, which is implemented as a cluster of component objects. The clustering mechanism allows the behavior of the composite object to be dynamically modified by adding interfaces to or removing interfaces from the composite object. Each interface, referred to as a "role interface," includes methods that implement the behavior associated with a "role" that the composite object may assume. For example, a role interface named "walk" may provide methods that, when added to a composite object, allow the simulated entity represented by the composite object to simulate walking behavior.

The composite object, also known as a cluster, preferably comprises a cluster object and zero or more role objects. The cluster object conceptually corresponds to the simulated entity and each role object corresponds to a set of roles that have been added to the simulated entity. Specifically, each role object has one or more role interfaces, each with methods that implement the behavior of a role. The cluster object provides a clustering interface with methods through which role objects, and thus role interfaces, can be added or deleted from the composite object. The cluster object keeps track of the role objects that are currently within the composite object and exposes each of the role interfaces outside the composite object. Because the role interfaces are exposed, a client program of the composite object can query the composite object for a specified role interface and, if that role interface is currently within the composite object, then it is returned to the client. The client program can then invoke a method of the returned role interface to effect a desired behavior of the simulated entity. For example, the method "step_forward" of the "walk" role interface may cause the simulated entity to move forward using legs.

The clustering mechanism allows each composite object and each role object to negotiate as to whether the role interfaces of each role object are to be added to the composite object. For example, if the simulated entity represents a person, then the composite object representing that person could refuse to add any role object, including the role object that implements the "walk" role interface, if the person has not yet been marked as born. Also, the knowledge of which simulated entities can potentially walk may be contained within the role object that implements the "walk" role interface. For example, the role object may require that certain properties of the target entity are defined so that the role object "knows" that walking behavior makes sense. In such a case, the role object could refuse to be attached to a simulated entity that represents a rock if it did not contain a property that indicates that self-movement is possible. Conversely, the role object may grant attachment to a simulated entity that represents a person because it contains a property that indicates that self-movement is possible. Thus, a preferred clustering mechanism gives both the composite object and a role object a chance to refuse a request to add the role object to the composite object.

In determining whether to grant or refuse a request, each object can determine whether the other object has characteristics that can support the roles in question. If the characteristics are not already present, the object can refuse attachment or can attempt to attach other role objects that provide the needed characteristics. For example, a role object that implements the "walk" role interface, in addition to requiring the "self-movement property," may depend upon the presence of other role interfaces to create appendages to simulate walking. In such a case, the role object could ask the composite object whether it contains role interfaces for determining the simulated entity's bounding box and mass and for manipulating the simulated entity's position. If the composite object contains the required role interfaces, the role object would then grant the request to add the role object that implements the "walk" role interface. Alternatively, if the composite object does not contain these role interfaces, the role object would either deny the request or would first attempt to attach another role object with the needed role interfaces.

Although a composite object internally comprises multiple component objects, this internal structure is not exposed outside the composite object. That is, a composite object appears to a client of the composite object as a single object that exposes multiple interfaces. The cluster object of a composite object provides a method through which a client can determine which role interfaces are currently provided by objects within the composite object. Also, a client can create an instance of the composite object in a single function call. Moreover, a user can store and retrieve composite objects, move them around, and invoke methods of the role interfaces without knowing anything about the internal composition of the composite object.

Figure 3:
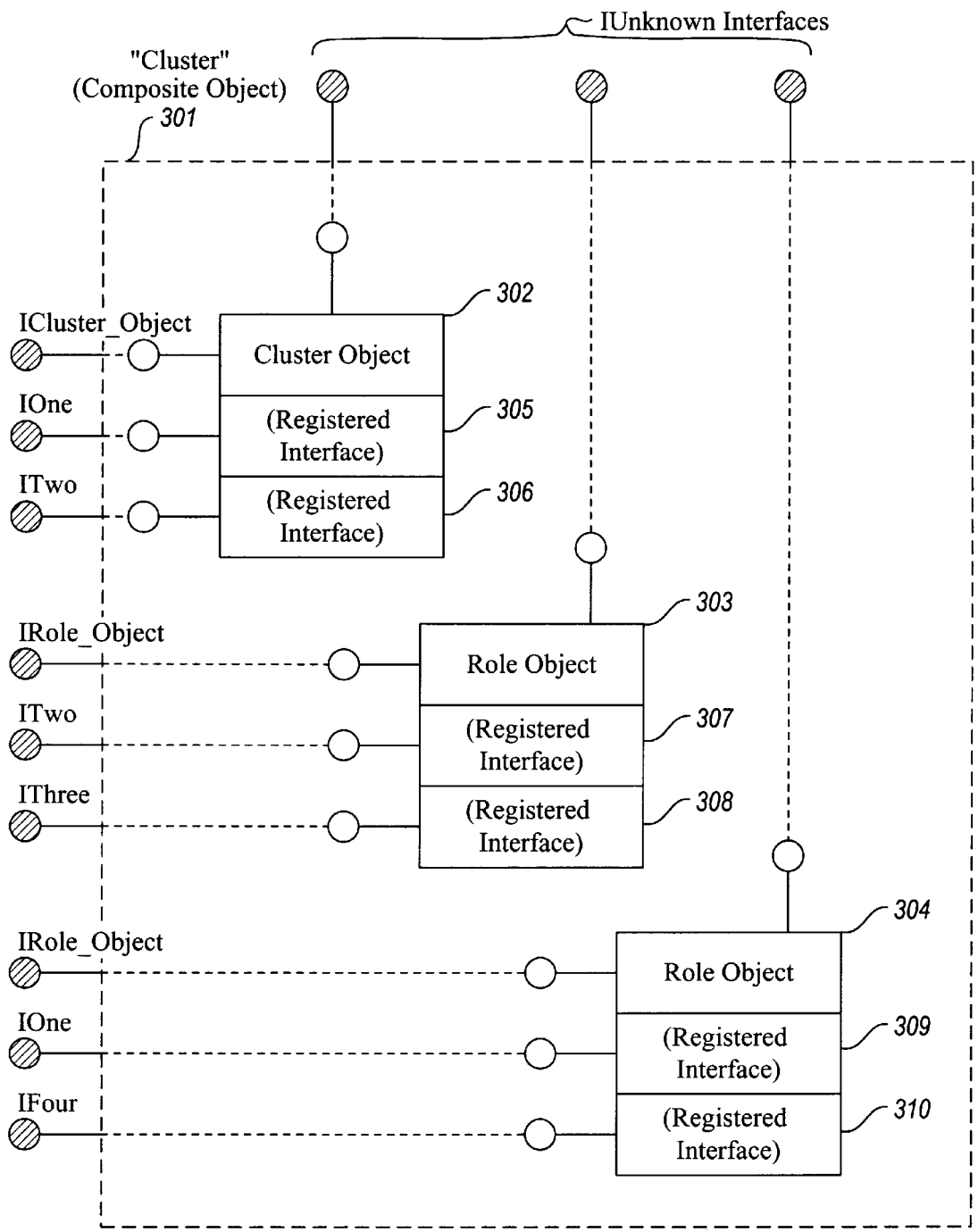
FIG. 3 is a block diagram of a composite object.

FIG. 3 is a block diagram of a composite object. Composite object 301 contains cluster object 302 and two role objects 303 and 304. A cluster object, such as object 302, is a COM object that supports the ICluster_Object interface. The ICluster_Object interface declares methods for attaching and detaching role objects and for accessing the role interfaces of the composite object. The ICluster_Object interface is described in detail below. A role object, such as role objects 303 and 304, is a COM object that supports the IRole_Object interface. The IRole_Object interface contains methods for attaching and detaching to a cluster object and is described below in further detail. The filled in interface circles of FIG. 3 represent the role interfaces that are exposed by composite object 301.

In the computer game environment, a simulated entity may lose certain capabilities. For example, if the simulated entity of the previous example gets in a sword battle and loses its legs, it may no longer have the capacity to walk. In this instance, the programmer either disables the role interface corresponding to the walking capability (the Walk interface implementation) or detaches the role object previously attached to provide the walking behavior.

In addition to the basic clustering mechanism discussed so far, a preferred clustering mechanism provides several other objects to aid a programmer in a computer game simulation environment. Specifically, the clustering mechanism provides a "producer object," for each executing simulation process. The producer object manages the composite objects for the simulation and maintains a cache of characteristics (e.g., properties) of the composite objects it manages. This cache enables the game programmer to quickly locate composite objects that contain a requested property. For example, the producer object can easily determine which simulated entities can fly in the simulated environment. Producer objects are discussed in greater detail below.

The preferred clustering mechanism also provides a "handler object" for each composite object. The handler object provides a level of indirection for accessing a composite object so that the composite object can be modified without stopping the simulation and still guarantee that all references to the object are destroyed. Accordingly, each reference to a composite object is stored as a reference to the associated handler object, rather than a reference to the composite object itself. For example, during the debugging of a simulation, a programmer may want to replace a simulated entity with another simulated entity that contains corrected code. To load the new code, the programmer would destroy the composite object, thereby enabling all the references to the composite object (through the handler object) to eventually be destroyed when the objects that contain the references detect that the composite object is dead. Ultimately, the new code is loaded, a new composite object with the corrected code is instantiated, and a new handler object is created. All of these operations can occur without bringing the simulation to a halt.

In addition, in some circumstances (e.g., where the interfaces and properties are maintained without change) the composite object may be replaced without destroying the handler object or any references to it. For example, a person represented in a game may be temporarily transformed into an angel. Rather than modify the composite object representing the person, it may be easier for a programmer to simply replace the composite object for the person with a composite object for an angel providing that it implements at least the interfaces of the person. This replacement can be accomplished by creating the composite object for the angel and setting the handler object associated with the person to point to the created composite object for the angel. Thereafter, each reference to the handler object automatically refers to the composite object for the angel. Note that this type of replacement is potentially dangerous because the objects that refer to the handler object have likely made certain assumptions about the capabilities and state of the composite object.

Also, the preferred clustering mechanism provides several helper objects (class definitions) for creating and keeping track of the various composite objects present in a game session and for keeping track of which composite objects have which role interfaces. Specifically, the clustering mechanism provides a "cluster list object," which maintains a list of composite objects that meet a specified criteria. A cluster list object is slightly fluid in that, when a composite object is "destroyed" (e.g., by invoking the "kill" method of the handler object), the composite object becomes inaccessible to the cluster list and to any other cluster list that contains a reference to that handler object. For example, a programmer may instantiate a cluster list object to maintain a list of all composite objects that represent all simulated entities currently in "Room A." In addition, the clustering mechanism provides a "role list object," which can be thought of as an index into a set of composite objects based upon a particular role interface. A role list object provides a static snapshot of composite objects that contain a specified role interface. A role list object, once created, does not change even if the contents of a composite object referred to changes. For example, a programmer may instantiate a role list object to point to all of the "Walk" role interfaces of the composite objects in "Room A" (from the composite objects on the cluster list created in the example above). If additional composite objects are added to "Room A," the instantiated role list object is not changed.

Helper objects also hide the details of object reference counting from a programmer by automatically updating the reference count of the role objects and cluster objects that are referred to on each cluster and role list. These capabilities free the programmer from worrying about the details of recovering storage for objects that are no longer referenced. Therefore, at some level, helper objects hide some of the complexities of object-oriented programming from a programmer.

The clustering mechanism also provides a role registration mechanism to hide some of the complexities of object-oriented programming. The role registration mechanism enables a programmer to write a custom cluster object or a custom role object without rewriting the QueryInterface method of each custom object to incorporate the new interfaces of the custom object. Instead, the programmer, in the initialization method of the custom object, invokes a "register_role" method (of the IBase_Object interface) to register each role interface of the custom object in an interface table. The registration mechanism provides a QueryInterface method that returns interface pointers by searching the interface table.

In addition to the computer game simulation environment and more traditional extended duration simulations, the clustering mechanism is useful in other contexts. For example, composite objects and helper objects can be used to simulate people and presentations in a video-conferencing application. Also, composite objects can be used to provide programmer toolkits or for application breadboarding tasks. Also, due to the inherent standardized nature of interfaces, third party vendors can add capabilities to the systems in each of these contexts in a consistent fashion. Thus, one skilled in the art will recognize that composite objects and helper objects are useful in many contexts where the need to change the behavior of an object is present.

In a preferred embodiment, the methods and systems of the preferred clustering mechanism are implemented on a computer system comprising a central processing unit, a display, a memory, and input/output devices. A preferred embodiment is designed to operate in an object-oriented environment, such as an environment that supports the Microsoft OLE 2.01 ("OLE") protocol established by Microsoft Corporation in Redmond, Wash. The Microsoft OLE 2.01 protocol is discussed further in *Object Linking and Embedding (OLE) 2.01 Design Specification*, Microsoft Corp., Sep. 27, 1993, which is herein incorporated by reference. One skilled in the art will recognize that embodiments of the preferred clustering mechanism can be practiced in other objected-oriented environments as well.

Figure 4:
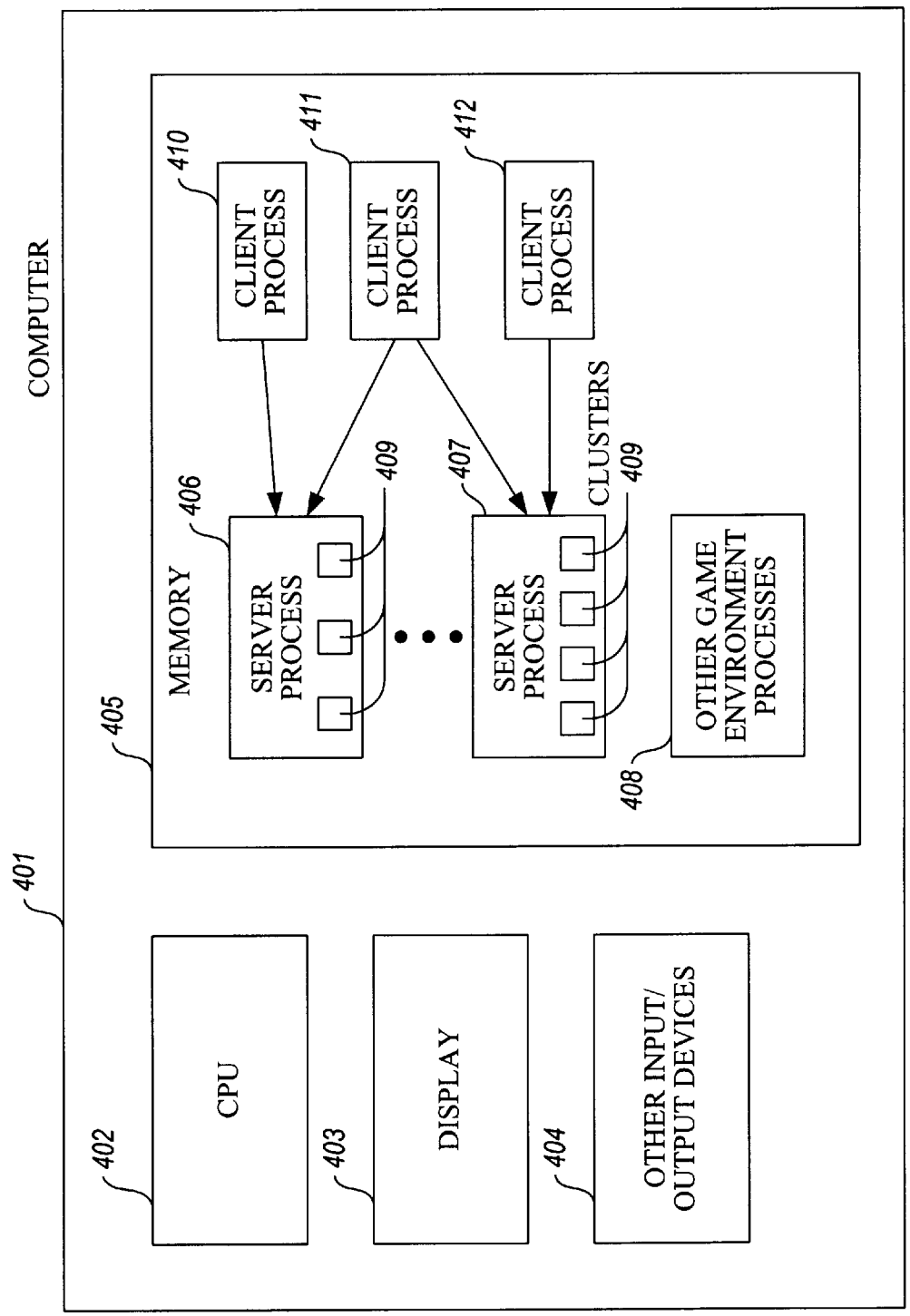
FIG. 4 is a block diagram of a general purpose computer system for practicing embodiments of the present invention.

FIG. 4 is a block diagram of a general purpose computer system for practicing embodiments of the preferred clustering mechanism. The computer system 401 contains a central processing unit (CPU) 402, a display 403, input/output devices 404, and a computer memory (memory) 405. In an example computer game environment, a simulation (server) process with its simulated entities (composite objects), as well as other executing programs, preferably reside in the memory 405 and execute on the CPU 402. Two simulation processes 406 and 407 are shown after loading several simulated entities, the composite objects (clusters) 409. Each cluster 409 contains one cluster object instance and zero or more role object instances (not shown but as discussed above), executing in the memory 405. Three client player processes 410, 411, and 412 are shown as connected to and using the simulation processes 406 and 407. Other computer game related programs also reside in the computer memory 405. One skilled in the art will recognize that other embodiments that utilize the preferred clustering mechanism, such as an extended duration simulation, will similarly reside and operate within computer system 401. Also, one skilled in the art will realize that the preferred clustering mechanism can be implemented in a distributed environment, where more than one computer system is used to communicate with other computer systems. For example, the server processes 406 and 407 and the client processes 410, 411, and 412 may be distributed across several machines. Further, the clusters 409 may each be distributed. That is, the cluster object and role objects comprising a composite object may be executing on several different computer systems.

Figure 5:
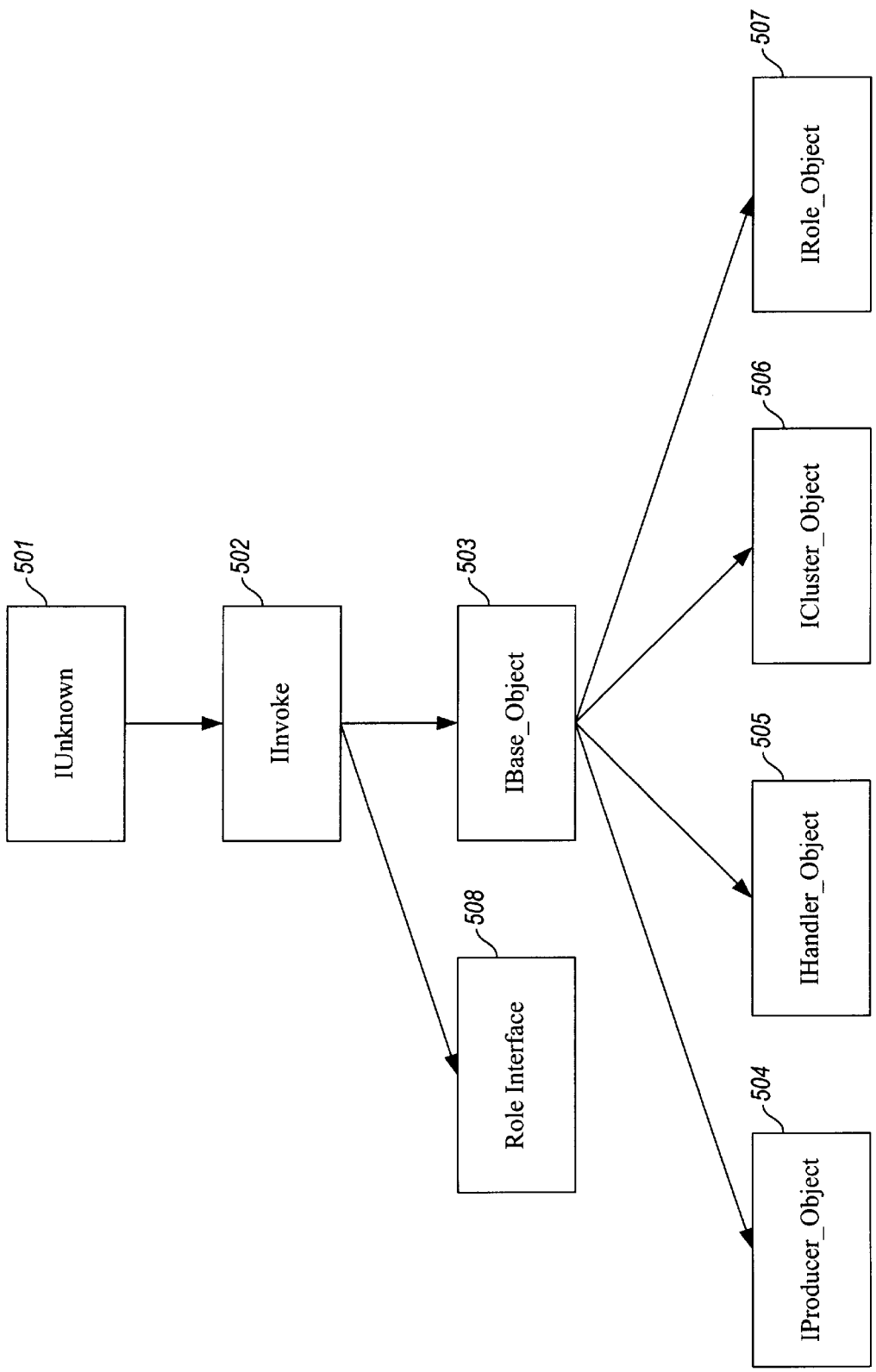
FIG. 5 is a block diagram of the hierarchical flow of several of the interfaces provided by the clustering mechanism.

According to an example embodiment of the preferred clustering mechanism, the system provides several interfaces (and associated class definitions) for the objects discussed above. FIG. 5 is a block diagram of the hierarchical flow of several of the interfaces provided by the clustering mechanism. One can refer to FIG. 5 to better understand the rules of inheritance used by a preferred clustering mechanism. Specifically, as reflected in FIG. 5, all COM objects are derived from the IUnknown interface 501. The clustering mechanism provides an IInvoke interface 502, which is derived from the IUnknown interface and which provides a basic dispatch mechanism for invoking by name the methods of each role interface derived from it. The IInvoke interface 502 (and its associated class definition) provides a base class for all role interfaces, for example, role interface 508.

The IBase_Object interface 503 in turn is derived from the IInvoke interface 502. The IBase_Object interface 503 provides a set of common methods used by the standard cluster mechanism objects. For example, the IBase_Object interface 503 contains a "register-role" method, which dynamically adds an interface to an object's list of supported interfaces.

For the purpose of this discussion, handler objects, producer objects, cluster objects, and role objects will be referred to as standard cluster mechanism objects. Whereas, role list objects and cluster list objects will be referred to as helper objects or cluster mechanism helper objects.

Each of the standard cluster mechanism objects provides an interface that is derived from the IBase_Object interface 503. Specifically, a cluster object supports the ICluster_Object interface 506, which is derived from the IBase_Object interface 503. Similarly, a role object supports the IRole_Object interface 507, which is derived from the IBase_Object interface 503. In addition, a producer object supports the IProducer_Object interface 504, which is derived from the IBase_Object interface 503. Similarly, a handler object supports the IHandler_Object interface 505, which is derived from the IBase_Object interface 503.

Each of these interfaces, as well as the details of the helper objects, are discussed below. Following the discussion of the details of these interfaces and objects, several examples are illustrated of how these objects and interfaces are used together to create custom composite objects.

Interface and Object Description

IInvoke Interface

The IInvoke interface provides a basic mechanism for invoking by name each of the methods of an interface that inherits the IInvoke interface. The IInvoke interface is inherited by the IBase_Object interface and thus is part of each standard cluster mechanism object. Also, to provide proper support for dispatching, each role interface is derived from the IInvoke interface. Each cluster object, role object, and role interface implements the IInvoke interface to ensure that, during run time when a program attempts to invoke a particular method of a specified interface identifier ("interface ID"), for example, by using the "dispatch" method of a cluster list object, the method is invoked for all of the interfaces of the composite objects that correspond to the specified interface ID. Unlike the standard OLE 2.01 environment, there is no restriction in the clustering mechanism that there only be one interface that corresponds to a particular interface ID. For example, there may be three or four exposed role interface pointers corresponding to the "IWalk" interface. When someone wants to invoke the "step_forward" method of the IWalk interface on all of the component objects of a composite object, the clustering mechanism (through the dispatch method of a cluster list object and IInvoke interface) ensures that each such "step_forward" method is called.

Table 1 lists a preferred IInvoke interface. Each method is described in detail following the table.

TABLE 1

```
interface IInvoke: public IUnknown {
    virtual HRESULT  first_method (long* pid) = 0;
    virtual HRESULT  enumerate_methods (long* id, String* M,
                                        String* P) = 0;
    virtual HRESULT  invoke (const String& method, const String&
                             parameters, String* result) = 0;
};
```

IInvoke::first_method

The "first_method" method returns a token that corresponds to the interface's first method. For example, an implementation of the IInvoke interface that is part of an ICluster_Object interface implementation would return a token corresponding to the "id" method, which is the first method declared in the ICluster_Object interface. (See Table 5, which defines the ICluster_Object interface.)

IInvoke::enumerate_methods

The "enumerate_methods" method returns a "format string" that corresponds to the token designated by the parameter "id." The format string returned corresponds to a method name, which can be passed as a parameter to the "invoke" method discussed next. The token is then set to be a token that corresponds to the next occurring method in the interface.

IInvoke::invoke

The "invoke" method is implemented specifically for each implementation of a class derived from the ICluster_Object or IRole_Object interfaces and for any role interface defined, including role interfaces written by third parties. The invoke method is responsible for actually invoking the method designated by the parameter "method" using the parameters designated by the parameter "parameters." The invoke method returns a result string in the "result" parameter indicating various status information.

Thus, for example, a typical implementation of the invoke method for an implementation of the ICluster_Object interface might be a "case" statement, which includes a clause for each method declared by the ICluster_Object interface. Specifically, the example invoke method would include a case statement which invokes each of the methods of ICluster_Object interface, namely "id," "has_property," "register_role," etc., when the corresponding method name is designated in parameter "method." Similarly. a computer game programmer who defines an interface "IOne" with two methods "get_position" and "set_position" would write an implementation of the invoke method that invokes "get_position" when the designated method is "GET_POSITION" and invokes "set_position" when the designated method is "SET_POSITION."

The IInvoke_interface thus provides a member function dispatching mechanism, which retrieves and invokes member functions based upon parameters specified as strings.

IBase_Object Interface

The IBase_Object interface is inherited by all of the standard clustering mechanism objects. This interface provides the methods (member functions) and data structures (data members) that are common to all of the standard clustering mechanism objects. Specifically, this interface provides methods for locking and unlocking a critical section lock for the object, for registering and enumerating interfaces (roles), and for interacting with a table of the interfaces (roles) of the object.

In a preferred embodiment, each standard clustering mechanism object provides an interface table so that interfaces can be added to the object using the register_role method after compile time and typically during object initialization time. Specifically, the QueryInterface method of the IBase_Object interface is implemented to search the interface table to locate a requested interface dynamically. In contrast, a typical implementation of QueryInterface in the OLE 2.01 environment uses a compile time based mechanism such as a case statement. Thus, one of the purposes of the role registration mechanism is to alleviate reimplementing Queryinterface for each derived class. Accordingly, the interface table and associated methods provide a level of automated programming.

Figure 6:
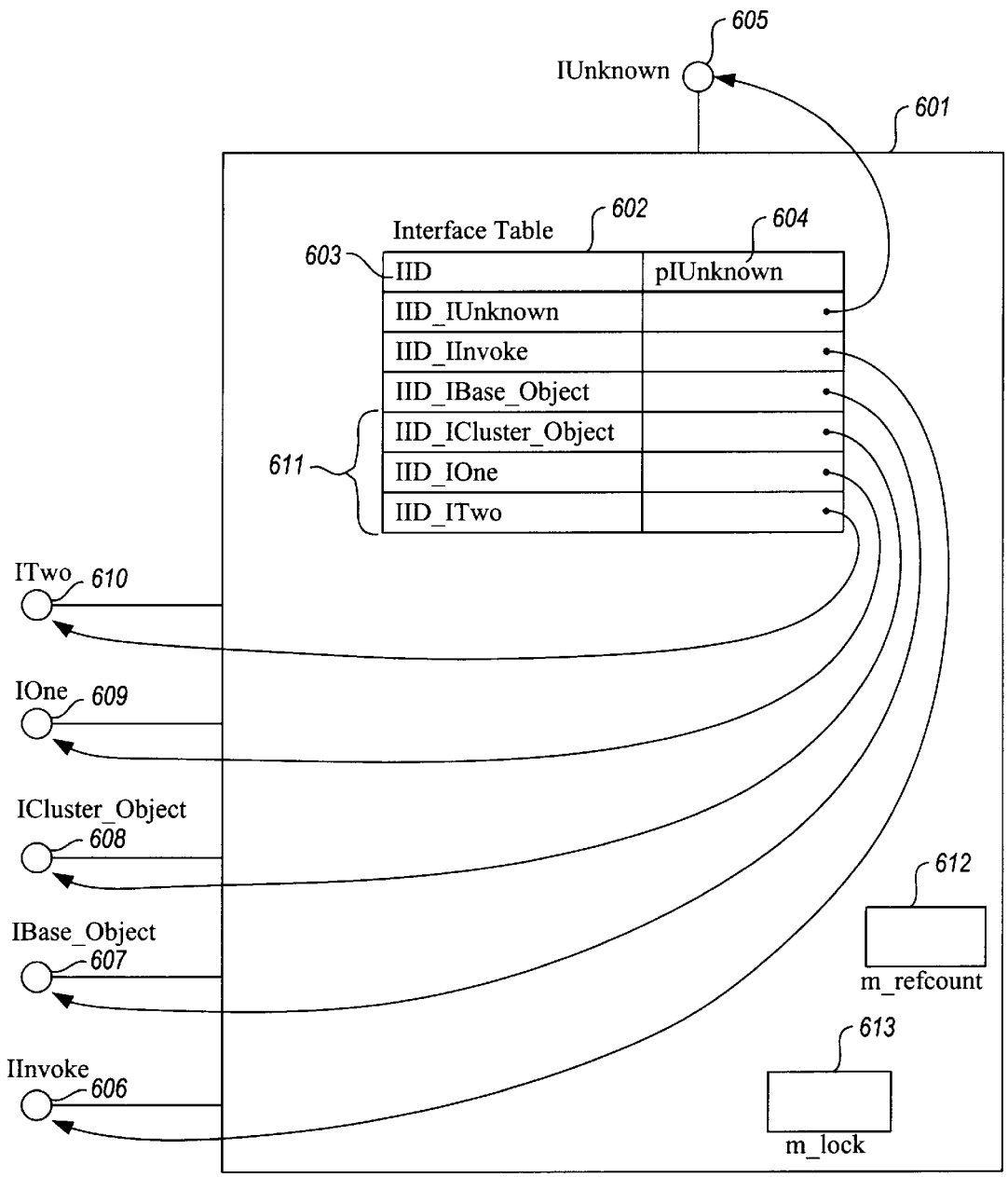
FIG. 6 is a block diagram of an example embodiment of a base object that implements the IBase_Object interface.

FIG. 6 is a block diagram of an example embodiment of a base object that implements the IBase_Object interface. In FIG. 6, the base object is shown as if it were implemented as part of cluster object 302 of FIG. 3. In particular, the base object in FIG. 6 is shown after cluster object 302 has been initialized and has registered the IOne interface 305 and the ITwo interface 306. The registration process places pointers to the registered interfaces in the interface table.

Specifically, base object 601 contains data members for an interface table 602, a reference count m_refcount 612, and a lock m_lock 613. The interface table 602 is indexed by an interface identifier field 603. For each interface registered, an interface ID is inserted in the table 602 with a pointer 604 to the corresponding interface of the object. For example, interface table 602, as shown by entries 611, contains interface pointers corresponding to the ICluster_Object interface 608, the IOne interface 609, and the ITwo interface 610 of cluster object 302, after these interfaces have been registered.

The constructor method for a preferred implementation of the IBase_Object interface registers the interfaces of the base object that correspond to interface identifiers IID_IUnknown, IID_IInvoke, and IID_IBase_Object (e.g., interfaces 605, 606, and 607) to allow the base interfaces of any clustering mechanism object to be recognized by the QueryInterface method. Similarly, the destructor method for a preferred implementation of the IBase_Object interface removes each of the entries from interface table 602. Table 2 lists a preferred IBase_Object interface. Each method is described in detail following the table.

TABLE 2

```
interface IBase_Object: public IInvoke {
    virtual HRESULT  lock (void) = 0;
    virtual HRESULT  unlock (void) = 0;
    virtual HRESULT  register_role (REFIID iid, IInvoke* pintf)
                                    = 0;
    virtual HRESULT  first_role (link_token* ptoken) = 0;
    virtual HRESULT  enumerate_roles (link_token* ptoken, IID* iid,
                                      IInvoke** pintf) = 0;
    virtual HRESULT  QueryInterface (REFIID iid, void**ppv) = 0;
};
```

IBase_Object::lock and IBase_Object::unlock

The "lock" and "unlock" methods implement critical section protection for the object. In a typical implementation, lock and unlock implement a semaphore, e.g., m_lock 613, illustrated in FIG. 6.

IBase_Object::register_role

The "register_role" method adds an interface to the object's list of supported interfaces contained in the interface table (e.g., interface table 602). The interface table can be implemented by any well-known method for efficiently implementing a database or list, or a table of information. Although the register_role method can be used to add interfaces to an object after compile time, due to OLE 2.01 requirements of COM objects, any calls to the register_role method are preferably made before any calls to the object's QueryInterface method. Otherwise, QueryInterface will not be aware of the interface before it is added and clients of the object may make assumptions based upon this information.

Specifically, if calls to the register_role method are made after initialization, then there is a risk that QueryInterface will have been queried for a designated interface ID and responded that it doesn't exist. Later, if register_role is invoked to add an interface corresponding to the designated interface ID, then any clients who are depending upon an assumption that the interface with the designated interface ID does not exist in the composite object may run into problems and have no means for being notified. For example, a role object may refuse to be attached to a composite object if an interface corresponding to IID_IFly exists. This test would not be satisfied if the composite object could later gain such an interface (surreptitiously) through the register_role method. One skilled in the art will recognize, however, that other uses of the register_role method may not be subject to such requirements.

IBaseObject_::first_role

The "first_role" method returns a token in parameter "ptoken," which corresponds to the object's first role. More specifically, the first_role method returns a token to the first interface indexed in the interface table 602 of the object.

IBase_Object::enumerate_roles

The "enumerate_roles" method returns the interface ID and an interface pointer corresponding to the entry in the interface table designated by the parameter "ptoken." The parameter "ptoken" is then updated to be the token corresponding to the next entry in the interface table. Thus, the enumerate_roles method can be called successively to retrieve all of the roles in the interface table of an object.

IBase_Object::QueryInterface

Figure 7:
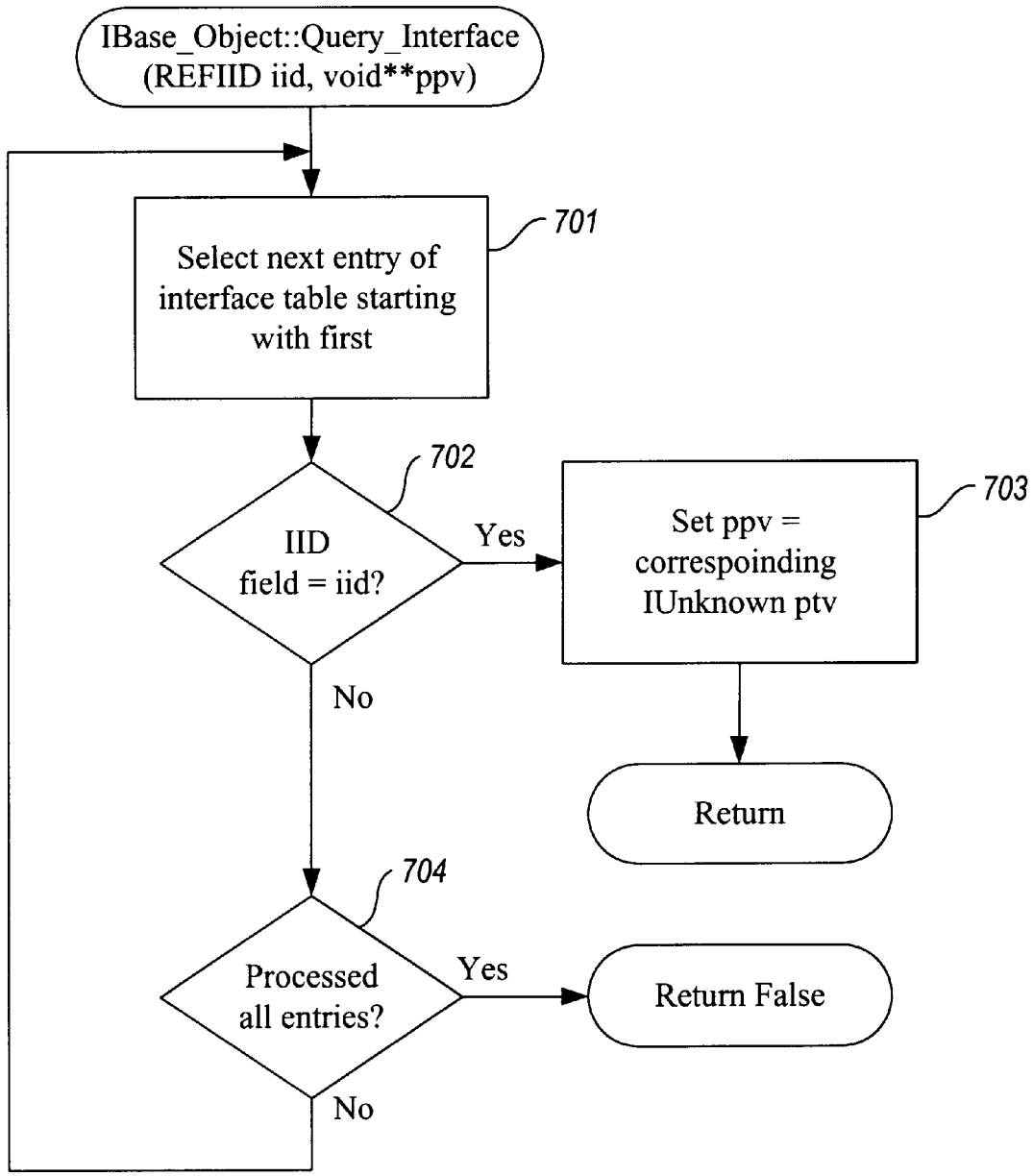
FIG. 7 is a flow diagram of the QueryInterface method for an example implementation of the IBase_Object interface.

As mentioned, the QueryInterface method is coded to search an object's interface table for the interface designated by input parameter "iid." FIG. 7 is a flow diagram of the QueryInterface method for an example implementation of the IBase_Object interface. The QueryInterface method dynamically consults interface table 602 to find and retrieve the stored interface pointer that corresponds to the designated interface ID. Specifically, in step 701, assuming that the interface table is implemented such that a search is required, the QueryInterface method selects the next entry of the interface table starting with the first entry. In step 702, the method compares the interface ID of the current interface table entry with the designated interface ID and, if it is the same, continues in step 703, else continues in step 704. In step 703, the method sets the return parameter "ppv" to the interface pointer contained in the corresponding interface pointer field (pIUnknown 604) of the interface table, and returns. In step 704, the QueryInterface method determines whether it has processed all table entries and, if so, returns false. Otherwise, the method loops back to step 701 to select the next entry of the interface table.

Note that the flow diagram of FIG. 7 assumes an implementation of the interface table which requires a linear search. One skilled in the art would recognize that various implementations of the interface table, many of which are more efficient, are available. For example, a hash table can be used or a database implementation, which both provide immediate indexing by interface ID.

IProducer_Object Interface

The IProducer_Object interface is implemented by a producer object, one of which is created for each simulation (server) process in a preferred computer game simulation environment. In one embodiment, an instance of the producer object is actually created in the game server process.

Each client process (corresponding to each user-player) invokes the function "CoCreateInstance" of the underlying OLE 2.01 environment to obtain a marshaled interface pointer to the actual producer object instantiated in the server process.

Each producer object is responsible for loading the new COM objects that will become part of a composite object owned by the corresponding player. Each producer object is also responsible for maintaining an up-to-date cache of which of the player's composite objects contain which properties. Thus, although cluster objects are responsible for registering and revoking properties for a particular composite object (as will be discussed further below), producer objects actually maintain a "global" list of properties and corresponding composite objects.

Figure 8:
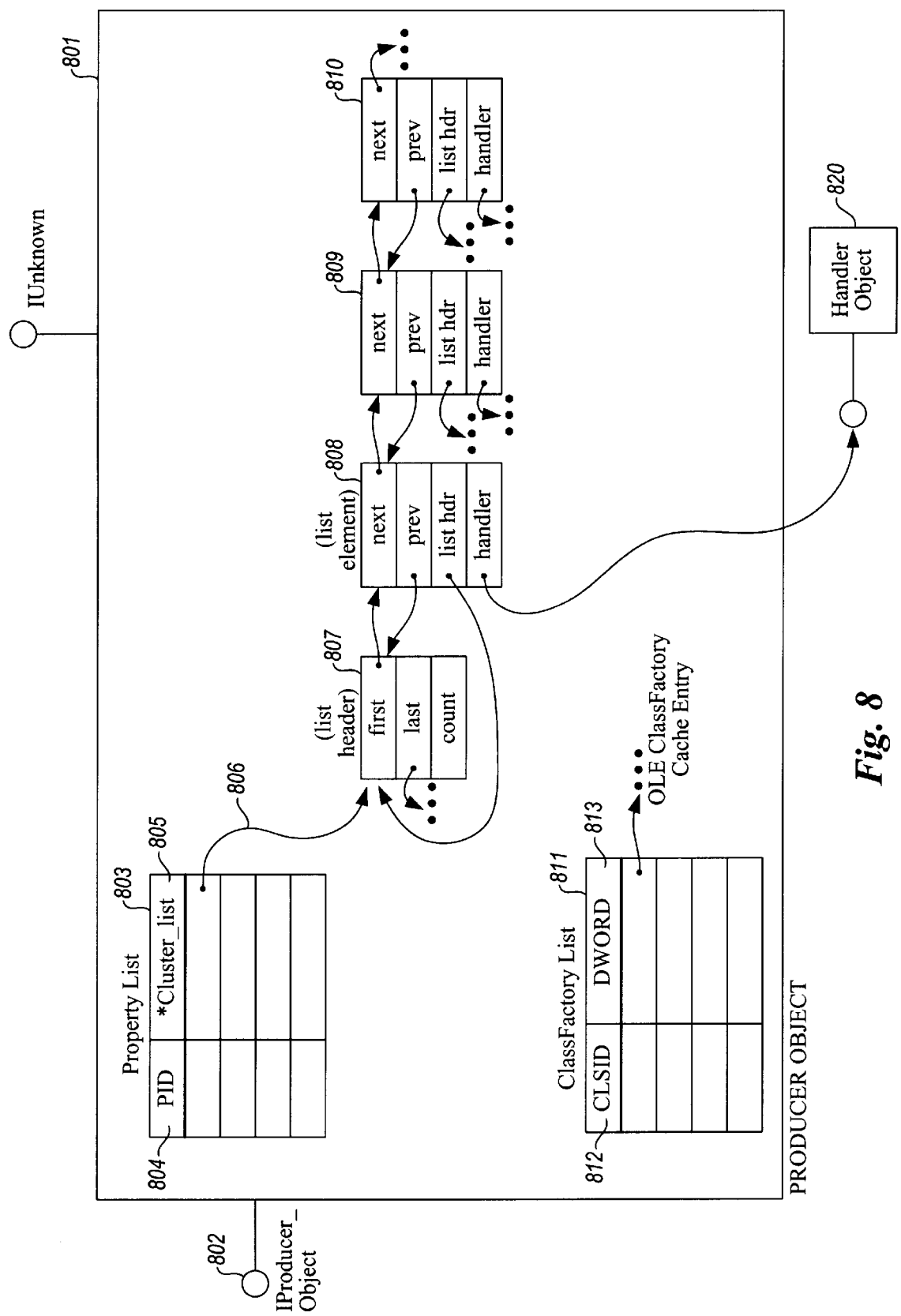
FIG. 8 is a block diagram of an example embodiment of a producer object.

FIG. 8 is a block diagram of an example embodiment of a producer object. In FIG. 8, the producer object 801 provides the IProducer_Object interface 802, which contains methods for implementing the data members shown in FIG. 8, as will be discussed below. As shown. producer object 801 contains two data members, a property list 803 and a class factory list 811. The class factory list 811 contains an entry indexed by CLSID 812 for each COM object loaded by the producer object. Each entry contains a corresponding tag 813, which indicates an entry in a system provided (OLE environment) class factory cache. One purpose of the class factory list 811 is to ensure that the class factory objects created and cached by the underlying system are properly unregistered and released when the producer object dies.

Property list 803 contains for each registered property a list of the composite objects managed by the producer object that contain that property. Specifically, each entry of the property list 803 contains a property ID 804, cluster list 805 pair. Each property ID field 804 contains a unique identifier (a globally unique identifier, GUID), which uniquely indicates the property. Each cluster list field 805 corresponds to the particular property ID for the entry and indicates a list of handler objects, which in turn refer to composite objects. For example, cluster list pointer 806 points to a list of handler objects. At the front of the list of handler objects is a list header 807, which contains a pointer to the first list element 808, a pointer to the last list element 810, and a count of the list elements. Each list element, e.g., list elements 808, 809, and 810, contains pointers to the next element, the previous element, the list header 807, and a handler object. For example, the handler field of list element 808 points to handler object 820.

As discussed earlier, any well-known implementation of a list, database, or similar data structure can be used to implement the property list. In a preferred embodiment, each list is implemented in a similar fashion using a list header object and list element objects, each of which point to the particular item of interest. In this case, the "pointers" to other list elements, and similar capabilities, are implemented as methods of a list element object.

The methods of the IProducer_Object interface maintain the class factory list 811 and the property list 803 of a producer object. Table 3 lists a preferred IProducer_Object interface. Each method is described in detail following the table.

TABLE 3

```
interface IProducer_Object: public IBase_Object {
    virtual HRESULT  load (REFCLSID clsid, IUnknown** unknown)
                         = 0;
    virtual HRESULT  count_handlers (REFGUID property, long* n)
                         = 0;
    virtual HRESULT  get_handlers (REFGUID property, const long
                         size, long* length,
                         IHandler_Object ** handlers) = 0;
    virtual HRESULT  register_property (REFIID iid, ICluster_Object *
                         cluster) = 0;
    virtual HRESULT  revoke_property (REFIID iid, ICluster_Object *
                         cluster) = 0;
}
```

IProducer_Object::load

The "load" method loads an instance of the COM object that corresponds to the designated CLSID. In a preferred implementation, the designated CLSID corresponds to a cluster object or a role object. The load method uses standard OLE functions to obtain the appropriate class factory object and to register it with the underlying system. Once the class factory object is registered with the system, the load method adds an entry into the class factory list 811.

Specifically, the load method first checks to see if there is a class factory object already loaded in the system and available. If so, the load method uses the existing class factory object and creates a new instance of the class using the standard OLE function "CoCreateInstance." Otherwise, the load method uses standard OLE functions to create and register a new class factory object for the class. The load method then creates and adds a corresponding entry into the class factory list 811. Once the class factory list 811 is updated, the load method creates a new instance of the indicated cluster or role object using "CoCreateInstance."

IProducer_Object::count_handlers

The "count-handlers" method returns the number of handler objects indicated by a specified entry in the property list 803. Specifically, the method first finds the entry in property list 803 that corresponds to the designated property ID. The method then retrieves the count field from the list header (e.g., list header 807) of the cluster list (e.g., cluster list 806) indicated by the property list entry.

IProducer_Object::get_handlers

The "get_handlers" method fills the designated array with pointers to the handler objects contained in the cluster list that corresponds to the designated property ID. A client program uses the handlers array returned by the get_handlers method to rebuild a cluster list in the client process.

Specifically, in embodiments where RPC calls are employed and composite objects may be distributed across several processes, a programmer needs to ensure that fixed-size data structures are sent in an RPC call. To aid the programmer, separate methods are provided for counting and for retrieving the contents of a list. For example, when a cluster list is created, the cluster list object first determines the number of composite objects that will be in the list (using the count_handlers method) and then creates an array of the appropriate size, which it passes as an input parameter to the get_handlers method to obtain an array of handler object references. From this array, the cluster list object creates the list data structure within its own process space. This process is known as rebuilding the cluster list on the client side. Cluster list creation is discussed in further detail below.

IProducer_Object::register_property

The "register_property" method determines whether there is already an entry in the property list 803 that corresponds to the designated property ID. If not, the method adds an entry into the property list 803 which points to the designated composite object.

IProducer_Object::revoke_property

The "revoke_property" method searches the property list 803 for an entry that corresponds to the designated property ID. Once found, the revoke_property method removes the list element that corresponds to the designated composite object from the cluster list of the determined property list entry.

IHandler_Object Interface

The IHandler_Object interface is implemented by a handler object. In a preferred embodiment there is a handler object associated with each composite object. In particular, the handler object associated with each composite object is created by the cluster object in the constructor method of the cluster object. Preferably, whenever a long-term pointer to a composite object is needed, a pointer to the handler object associated with the composite object is instead stored. Accordingly, a level of indirection is provided so that composite objects can be added and removed from the system more easily. Handler objects preferably account for composite objects that are either dead or suspended.

Figure 9:
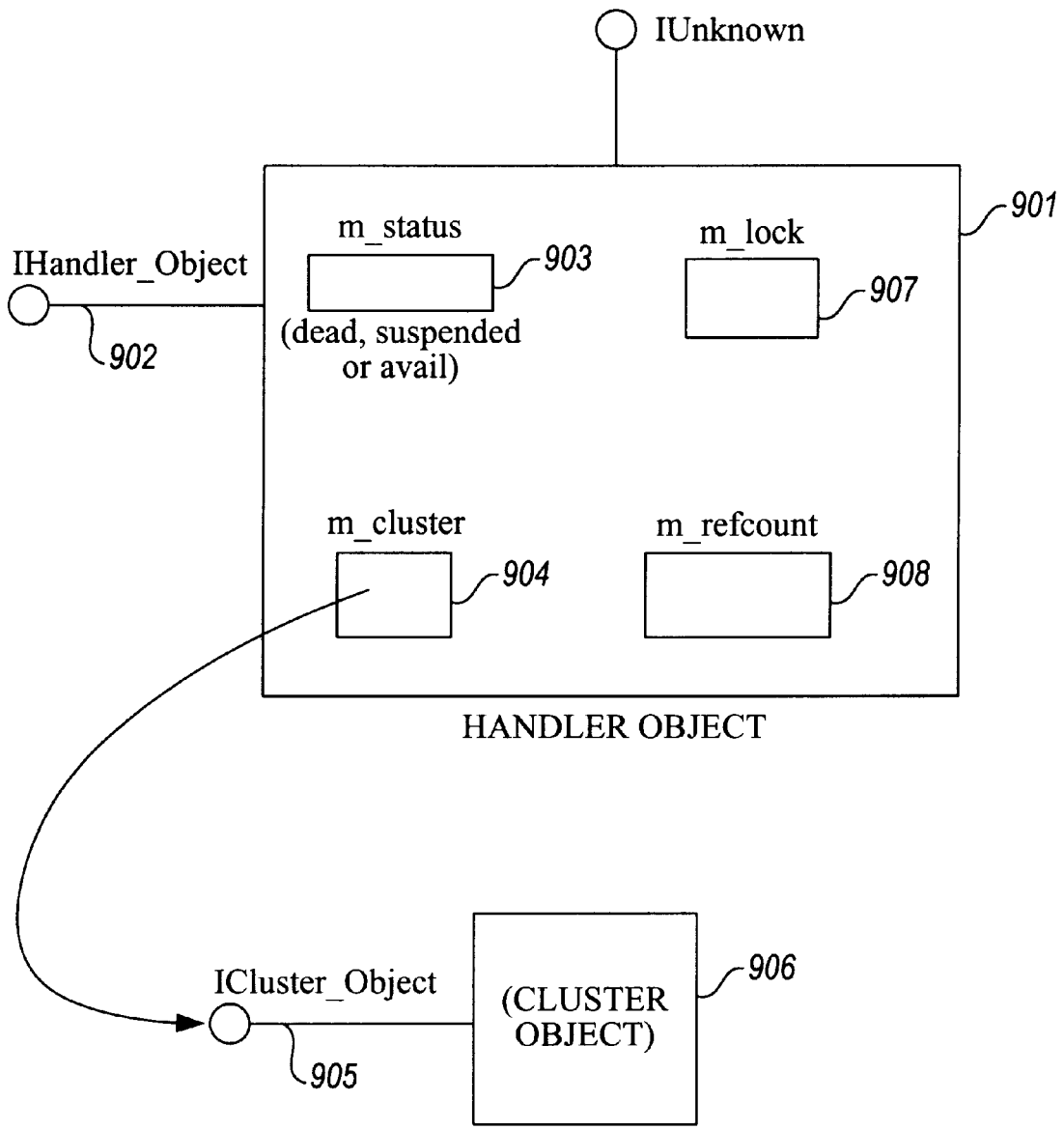
FIG. 9 is a block diagram of an example embodiment of a handler object.

FIG. 9 is a block diagram of an example embodiment of a handler object. In FIG. 9, handler object 901 implements the IHandler_Object interface 902 and contains several data members. Specifically, handler object 901 contains cluster object pointer m_cluster 904, which contains an indicator to the ICluster_Object interface 905 of the associated cluster object 906. Handler object 901 also contains status field m_status 903, which is used to record whether the composite object is "dead," "suspended," or "available." In addition, as with all other objects derived from the Ibase_Object interface, handler object 901 contains a critical section lock m_lock 907 and a reference count field m_refcount 908. In this instance, it is beneficial to provide the critical section lock 907, because updating the status of the handler object may generate a critical section problem when multiple client programs are updating the associated cluster object.

Table 4 lists a preferred IHandler_Object interface. Each method is described in detail following the table.

TABLE 4

```
interface IHandler_Object: public IBase_Object {
    virtual HRESULT  cluster (ICluster_Object **ppcluster) = 0;
    virtual HRESULT  set_cluster (ICluster_Object *pcluster) = 0;
    virtual HRESULT  kill (void) = 0;
    virtual HRESULT  suspend (void) = 0;
};
```

IHandler_Object::cluster

The "cluster" method returns a pointer to the handler object's associated composite object if the status field (m_status 903) indicates that the associated composite object is available. Otherwise, if the status field indicates that the composite object is dead or suspended, then a corresponding status code is returned. Based upon the returned status code, objects that refer to the handler object can take appropriate action.

For example, if a cluster list helper object invokes the cluster method to locate a specified composite object, it will take appropriate action based upon the status code returned. Specifically, if the cluster method returns a pointer to the cluster object of the associated composite object, then the cluster list helper object will use the retrieved pointer to the cluster object. Alternatively, if the cluster list helper object receives an indication that the composite object is dead, then the cluster list helper object removes the associated handler object from its list of composite objects. Alternatively, if the cluster list helper object receives an indication that the composite object is suspended, then the cluster list helper object keeps the handler on its list, but assumes that no role interfaces of the composite object are available. (The cluster list helper object will ignore the handler object and avoids calling the get_roles method of the corresponding cluster object.)

IHandler_Object::set_cluster

The "set_cluster" method sets the pointer to the handler object's associated composite object to the designated cluster object. This method can be used to replace an associated composite object without effecting any of the references to it (through the handler object). Note, however, that this method provides dangerous capabilities if the new composite object fails to provide the same role interfaces and properties.

To replace a composite object in this fashion, a programmer would preferably maintain a list of the existing attached role interfaces of a current composite object before destroying it. Then, after instantiating a replacement composite object and using the set_cluster method to associate it with the same handler object, the programmer would create and attach any role objects on the list that weren't automatically attached during the creation process of the replacement composite object.

IHandler_Object::kill

The "kill" method changes the status field (m_status 903) of the handler object to indicate that the associated composite object is dead and calls the Release method of the ICluster_Object interface pointed to by the cluster pointer (m_cluster 904) to decrement the reference count of the associated cluster object. The method then changes the cluster pointer to no longer point to the cluster object, in effect "killing" the cluster object. (In reality, the cluster object is preferred destroyed only when its reference count reaches zero.)

IHandler_Object::suspend

The "suspend" method changes the status field (m_status 903) to indicate that the composite object is now suspended. In one embodiment the cluster object's reference count is decremented and the m_cluster data member is set to "NULL." The status is different than with the "kill" method to enable a new composite object to be associated with an existing handler.

ICluster_Object Interface

The ICluster_Object interface is implemented by a cluster object to provide the basic clustering mechanism for a composite object. Recall that each composite object is comprised of one cluster object and zero or more role objects. The ICluster_Object interface provides the mechanisms for attaching and detaching role objects and for enabling and disabling roles, as well as for keeping track of what properties the composite object contains.

Figure 10:
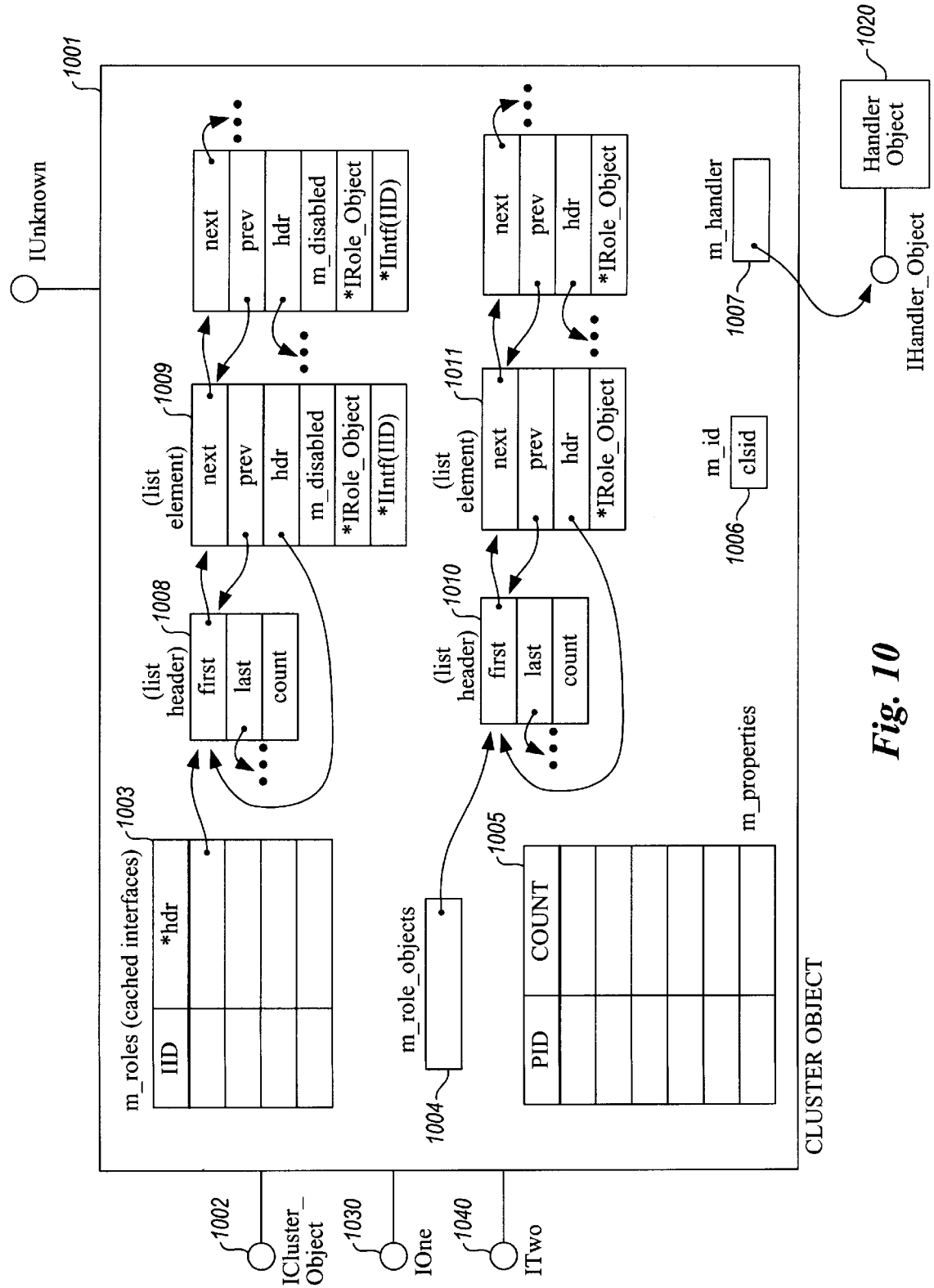
FIG. 10 is a block diagram of an example embodiment of a cluster object.

FIG. 10 is a block diagram of an example embodiment of a cluster object. In FIG. 10, cluster object 1001 supports the ICluster_Object interface 1002, which is discussed in detail below. Cluster object 1001 represents the cluster object 302 in FIG. 3. Thus, the cluster object 1001 also implements the IOne interface 1030 and ITwo interface 1040. Cluster object 1001 contains several data members to assist in implementing the functionality of the ICluster_Object interface. In particular, cluster object 1001 contains five data members, including a CLSID 1006, a handler pointer 1007, a property list 1005, a roles cache 1003, and a list of role objects 1004. The CLSID m_id 1006 contains the CLSID of the cluster object. For a derived cluster object, this CLSID may uniquely specify the composite object type. The handler pointer m_handler 1007 contains a reference to a handler object 1020, which is created to refer specifically to this cluster object. The property list m_properties 1005 is a list of property IDs and their respective counts. Multiple clients can call the ICluster_Object::register_property and ICluster_Object::revoke_property methods to set or revoke a particular property for the composite object. Preferably when new properties are registered or properties deleted, then the associated producer object is appropriately notified. The list of role objects m_role_objects 1004 is a list of all of the role objects that are members of the composite object. Each list element 1011 of the list of role objects 1004 contains the "standard" list element information (next, previous, and list header pointers) and a pointer to the IRole_Object interface of an attached role object. The roles cache m_roles 1003 is a list of all of the roles (interfaces) supported by all of the component objects of the composite object.

Specifically, for each interface identifier supported by the composite object, the roles cache 1003 stores a pointer to a list of the corresponding interfaces present in the component cluster object and role objects. More specifically, each entry in cache 1003 points to a list header 1008, which in turn points to a collection of list elements 1009. In the embodiment shown, the implementation of this list is a linked list. Ihowever, as with all the other lists mentioned in this application, any well-known mechanism for implementing a variable length linked list or database may be used. Each list header 1008 provides access to the first and last list elements, as well as a count of the number of list elements. Each list element 1009 contains the "standard" list element information such as a pointer to the next list element, a pointer to the previous list element, and a pointer to the list header 1008. In addition, each list element 1009 contains a disabled count and a pointer to the IRole_Object interface of the role object that contains the interface that corresponds to interface ID of the current cache entry. If the interface is part of a cluster object, then the pointer to the IRole_Object interface is set to null. In addition, each list clement 1009 contains a pointer to the interface (of the role object or cluster object) that corresponds to the interface ID of the current cache entry. In a preferred embodiment, since this cache can be used to invoke a method of all of the interfaces in the composite object that correspond to a specified interface ID (using the dispatch mechanism of a cluster list object and the invoke method of the IInvoke interface), the pointer to the interface is typically a pointer to an IInvoke implementation.

The methods of the ICluster_Object interface use these data members to maintain the abstraction of a composite object. Table 5 lists a preferred ICluster_Object interface. Each method is described in detail following the table.

TABLE 5 interface ICluster_Object: public IBase_Object {
    virtual HRESULT  id (CLSID* clsid) = 0;
    virtual HRESULT  has_property (REFGUID pid, BOOL* propflag)
                            = 0;
    virtual HRESULT  register_property (REFGUID pid) = 0;
    virtual HRESULT  revoke_property (REFGUID pid) = 0;
    virtual HRESULT  attach (IRole_Object* prole_obj) = 0;
    virtual HRESULT  detach (IRole_Object* prole_obj) = 0;
    virtual HRESULT  enable_role (link_token& token) = 0;
    virtual HRESULT  disable_role (link_token& token) = 0;
    virtual HRESULT  dispatch (REFIID iid, const String&

TABLE 5-continued

```
                    method_name, const String&
                    method_params, String* rtnstr) = 0;
    virtual HRESULT  kill (void) = 0;
    virtual HRESULT  suspend (void) = 0;
    virtual HRESULT  handler (IHandler_Object** pphandler) = 0;
    virtual HRESULT  count_roles (REFIID iid, long* count) = 0;
    virtual HRESULT  get_roles (REFIID iid, const long, long*,
                                IRole_Object** role_object_buffer,
                                IInvoke** pintf_buffer, link_token*
                                ptoken) = 0;
};
```

ICluster_Object::icluster_object

The constructor method for a cluster object registers the ICluster_Object interface (using IBase_Object::register_role) and instantiates a new handler object to correspond to this composite object. In addition, it registers a property corresponding to the CLSID of the composite object. This method also increments the reference count of the producer object, so that the producer object will not be destroyed as long as one composite object remains outstanding. Recall that each simulation (server) process has an associated producer object. A global reference to the associated producer object is maintained for the benefit of all composite objects belonging to the simulation.

ICluster_Object::~icluster_object

The destructor method for the ICluster_Object interface uses the list of role objects (m_role_objects 1004) to locate and detach each role object attached to the composite object. The method then informs the associated producer object that each property in the property list (m_properties 1005) is being revoked and deletes each property list entry. The destructor method then empties the role cache (m_roles 1003) and releases the cluster object's reference to the handler object and the associated producer object.

ICluster_Object::id

The "id" method returns the class identifier that is stored in the data member m_id 1006.

ICluster_Object::has_property

The "has_property" method searches the property list (m_properties 1005) to determine whether there is an entry corresponding to a designated property ID. If so, the method returns true in the parameter "propflag," otherwise the method returns false.

ICluster_Object::register_property

The "register_property" method registers a property by incrementing the appropriate count in the property list. Specifically, the method determines whether there already exists a property entry that corresponds to the designated property ID. If so, the method increments the count field associated with the determined property list entry. If the property list entry indicates that this is a new property (the count equals one), then the producer object's register_property method is invoked to notify the producer object that this composite object contains a new property. Otherwise, if there is not yet a corresponding entry in the property list, then an entry is created to correspond to the designated property ID and the producer object notified as above.

ICluster_Object::revoke_property

The "revoke_property" method revokes the property that corresponds to the designated property ID by decrementing the associated count of the appropriate entry in the property list (m_properties 1005). When the count field of the corresponding entry in the property list is decremented to zero to indicate that the property no longer exists, the producer object is appropriately notified by invoking its revoke property method.

ICluster_Object::attach

The attach method attaches a role object to the composite object. Once a role object has been successfully attached, the role interfaces of the attached role object become part of the composite object. Appropriate entries are added to the list of role objects (m_role_objects 1004) and to the role cache (m_roles 1003). The attach method of the cluster object is also responsible for calling the attach method of the role object to be attached in order to perform a negotiated attachment. The attach method also increments the reference count of the role object to indicate that it contains a reference to it.

A preferred embodiment assumes that a role object can never be attached to another composite object once it has been attached. This assumption protects against attaching a role object to more than one composite object at a time when the deletion of all of the structures associated with a detached role object is delayed. For example, deletion of the structures may not occur immediately if there are role list objects, which contain pointers to the attached (now detached) role objects. Such a role list object would not operate properly if the attached role object were moved before the role list object's data structures were changed to delete the role object.

Figures 11A, 11B:
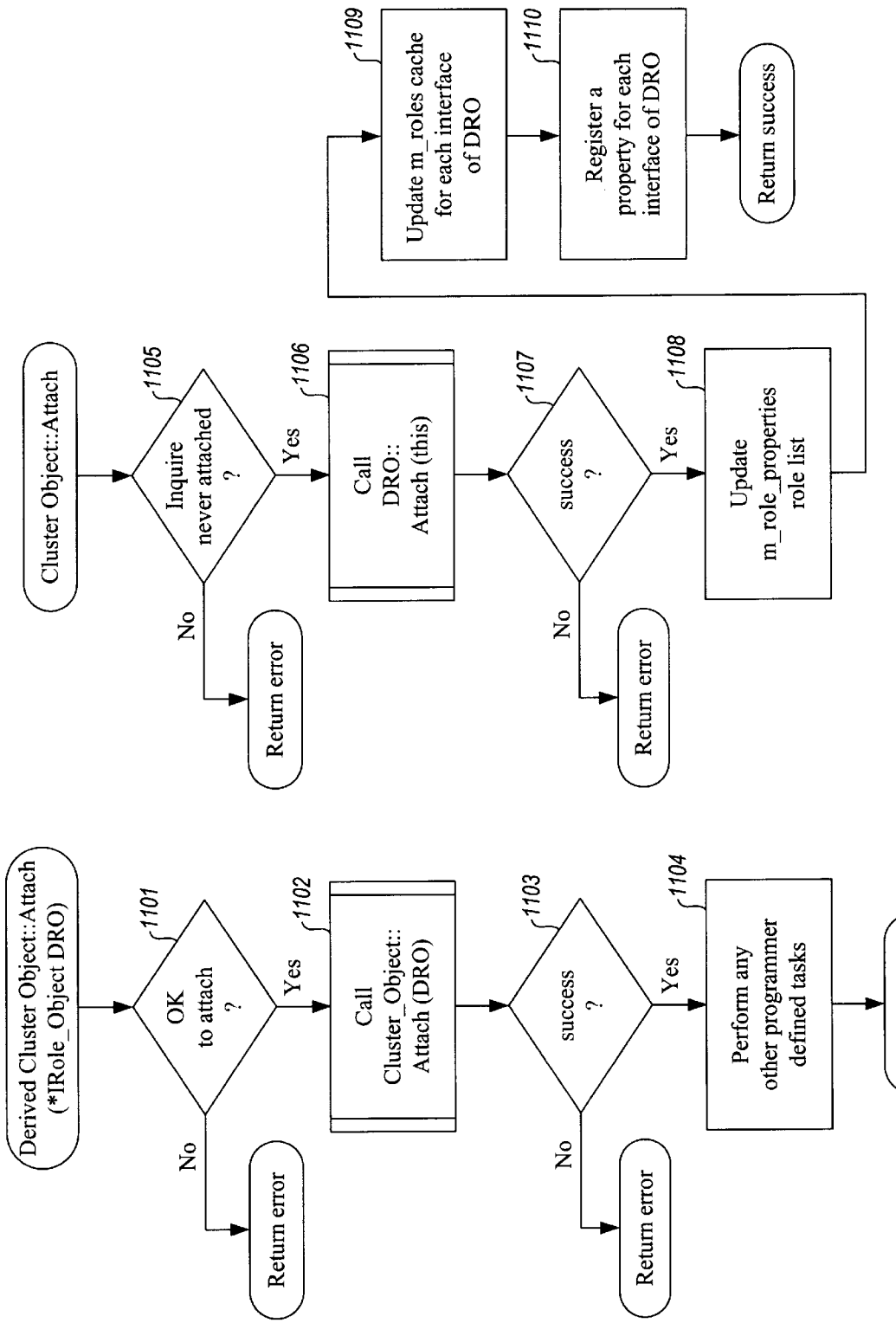
FIGS. 11A, 11B, 11C, 11D is a block diagram of the interaction between example attach methods of a cluster object and a role object during a negotiated attachment procedure.
Figures 11C, 11D:
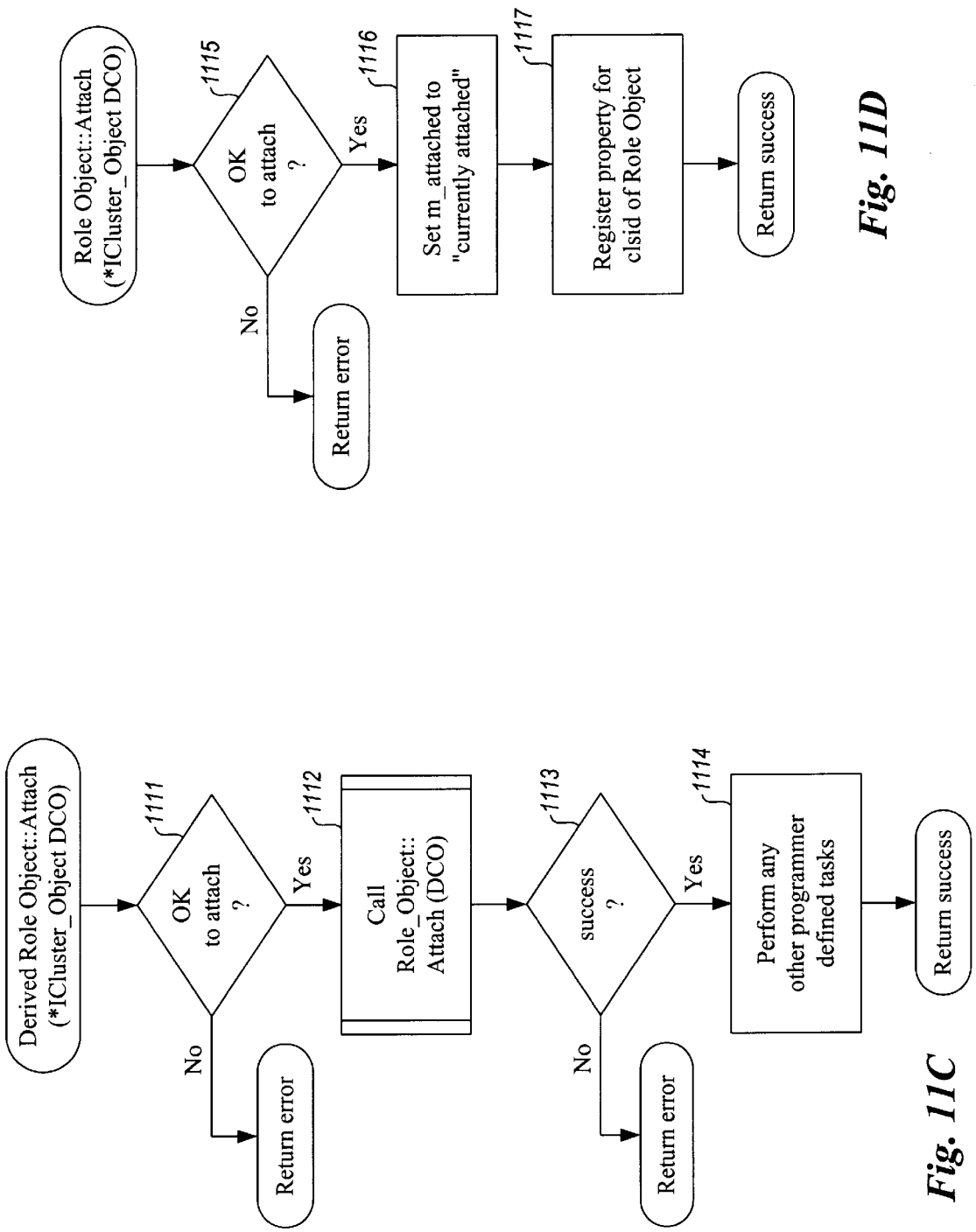

FIG. 11 is a block diagram of the interaction between example attach methods of a cluster object and a role object during a negotiated attachment procedure. In FIG. 11, steps 1101–1104 describe the attach method of a cluster object derived from the base cluster object shown in FIG. 10. The derived cluster object corresponds to a custom cluster object created, for example, by a simulations programmer to add additional roles to a cluster object. Steps 1105–1110 describe the attach method of the base cluster object shown in FIG. 10. Steps 1111–1114 describe the attach method of a role object derived from a base role object, as will be discussed with reference to FIG. 12. The derived role object corresponds to a custom role object created by the programmer to define roles for the role objects which were not already supplied. Steps 1115–1117 correspond to the attach method of the base role object described below with reference to FIG. 12.

The negotiation procedure illustrated in FIG. 11 allows each object participating in the negotiation to determine whether the designated role object can be attached to the cluster object whose attach method is being invoked. Thus, before a derived cluster object determines that it can do its own programmer-defined tasks, it calls the base cluster object's attach method, which in turn calls the derived role object's attach method, which in turn calls the base role object's attach method to determine whether attachment is allowed. Only after the role object has had an opportunity to decline attachment does the cluster object actually attach the role object.

Specifically, in step 1101, the derived cluster object determines by programmer-supplied rules whether it is okay to attach the designated role object. For example, this step might involve determining whether a particular set of properties exists in the composite object. If so, in step 1102, the attach method calls the attach method of the base cluster object class to attach the designated role object. Only after the attach method of each of the base cluster object, derived role object, and base role object returns successfully, does the attach method of the derived cluster object attempt to perform other programmer defined tasks in step 1104.

Steps 1105–1110 are executed by the attach method of the base cluster object shown in FIG. 10. In step 1105, the cluster object inquires (by invoking the attached method) of the role object whether the role object has never been attached. If the role object has been previously attached, then an error is returned. Otherwise, in step 1106, the attach method calls the designated role object's attach method, passing a pointer to itself to give the role object an opportunity to participate in the negotiation process. If the role object designates that it wishes to be attached in step 1107 (the call was successful), then the method continues in step 1108. Otherwise, the method returns an error to the derived cluster object to cause the attachment procedure to fail. In step 1108, the attach method updates the list of role objects (m_role_objects 1004) by adding a new entry that points to the IRole_Object interface of the designated role object. In step 1109, the attach method updates the roles cache (m_roles 1003) by adding entries which correspond to each role (interface) of the designated role object. Then in step 1110, the attach method of the cluster object registers a property (by invoking register_property) for each interface of the designated role object and returns successfully.

Figure 12:
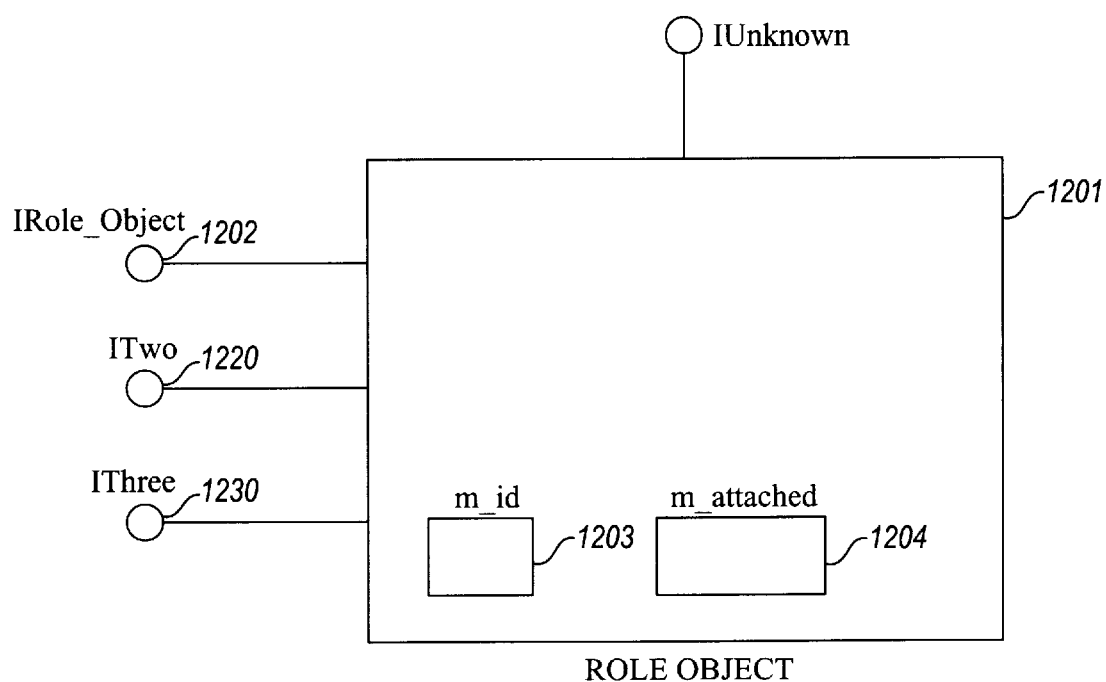
FIG. 12 is a block diagram of an example embodiment of a role object.

Steps 1111–1114 describe the negotiation procedure for a role object derived from the base role object described in FIG. 12. Like steps 1101–1104, these steps are written by a simulations programmer and can contain any desired logic. So, for example, in step 1111, when the derived role object determines whether it is okay to attach itself to the designated cluster object, the role object might inquire of the cluster object whether it supports certain needed interfaces. In step 1112, after the derived role object determines that it can successfully attach itself to the designated cluster object, then the derived role object invokes the attach method of the base role object. In step 1113, the derived role object determines whether the attach method of the base role object was successful and, if so, continues in step 1114, else returns an error. In step 1114, the derived role object performs any other programmer-defined tasks and returns successfully.

Steps 1115–1117 correspond to the attach method of the base role object shown in FIG. 12. In step 1115, the base role object determines whether the designated cluster object is one to which it wishes to attach. In one embodiment, this step is optional. In step 1116, the base role object sets a data member in the role object to indicate that the role object is now attached. In step 1117, the base role object registers a property corresponding to the CLSID of the role object, and returns successfully.

ICluster_Object::detach

The "detach" method detaches a designated role object. Specifically, the detach method locates the designated role object in the list of role objects (m_role_objects 1004). Once the corresponding list element is located, the method invokes the detach method of the indicated IRole_Object interface to enable the role object to perform detachment procedures. Then, the detach method removes each of the designated role object's interfaces from the cluster's role cache (m_roles 1003). Lastly, the method decrements the reference count of the designated role object, thereby enabling the role object to be destroyed when its reference count reaches 0.

ICluster_Object::enable_role

The "enable_role" method obtains the entry in the role cache (m_roles 1003) that corresponds to the designated token and decrements the disabled count of the cache entry. The disabled count provides a general mechanism for keeping track of disabled role interfaces. Preferably, a count rather than a binary value is stored to enable multiple objects to suppress or expose a role at the same time. For example, two role objects may wish to suppress the same interface in the cluster object before each grants attachment. If one role object later becomes detached and enables the role interface, it is preferred that the role interface still be suppressed from the other role object's perspective.

ICluster_Object::disable_role

The "disable_role" method obtains the entry in the role cache (m_roles 1003) that corresponds to the designated token and increments the disabled count of the cache entry. See the description above for the "enable_role" method.

ICluster_Object::dispatch

The "dispatch" method calls the invoke method of each role of the composite object that corresponds to the designated interface ID. Recall that a composite object may contain multiple instances of a particular interface. The dispatch method enables invocation of a method of all of the instances of a specified interface.

In a preferred embodiment, the dispatch method uses a role list helper object to first create a role list that contains all of the roles of the current composite object having the designated interface ID. The creation of a role list helper object is discussed in more detail below. Role list helper objects can be used to iterate over a set of interfaces. The dispatch method then iterates over the role list maintained by the role list helper object and, for each role on the role list, calls the invoke method with the designated method name and parameters. The dispatch method then returns the return code returned by the invoke method. Accordingly, the dispatch method is used to invoke all of the interfaces of a composite object which correspond to a particular interface ID, thereby treating the composite object as a single object to clients of the composite object.

ICluster_Object::kill

The "kill" method invokes the kill method of the associated handler object, which is referred to by the handler pointer (m_handler 1007).

ICluster_Object::suspend

The "suspend" method invokes the suspend method of the associated handler object, which is referred to by the handler pointer (m_handler 1007).

ICluster_Object::handler

The "handler" method returns a pointer to the handler designated by the handler pointer (m_handler 1007). The handler that corresponds to a particular composite object is not changed once it is created.

ICluster_Object::count_roles

The "count_roles" method is used to determine how many role interfaces are attached to the composite object that correspond to a designated interface ID. This count is used to allocate a fixed size array of such interface pointers for use in RPC calls, which require known parameter sizes. To determine the count, the count_roles method searches the roles cache (m_roles 1003) to locate the entry corresponding to the designated interface ID. Once the appropriate cache entry is located, the value of the count field stored in the corresponding list header is retrieved and returned.

ICluster_Object::get_roles

The "get_roles" method fills, from the roles cache (m_roles 1003), a designated array with pointers to the interfaces of the role objects and cluster object that correspond to the designated interface ID. In addition, the get_roles method retrieves the corresponding pointers to the IRole_Object interfaces and returns them in a second designated array. In addition, for each element in the list indicated by the corresponding cache entry, a token to the list element is returned in a third designated array for later efficient access.

IRole_Object Interface

The IRole_Object interface is implemented by a role object to enable the role object to participate in the attachment and detachment procedures. Recall that a role object is a stand-alone COM object, which provides one or more roles to a composite object. In a preferred embodiment, role objects are divided into two categories. Those that support "common" roles to be used with many different composite objects and those that support "unique" roles to be used with only particular types of composite objects. For example, a common role might be the IWalk role discussed in the overview. An example of a unique role is a role that calculates the magic capabilities of a potion.

In addition, the implementations of a role can either be "generic" or "specialized." In a preferred embodiment, generic role implementations preferably use only other roles to access the composite object. With this assumption, a generic role can be added to any composite object that contains the set of required roles. Specialized roles use knowledge about the implementation of a particular cluster object or role object and are intended to work with that particular cluster or role object.

FIG. 12 is a block diagram of an example embodiment of a role object. In FIG. 12, role object 1201 implements the IRole_Object interface 1202, which contains methods for maintaining the data members shown in FIG. 12. As shown, role object 1201 represents the role object 303, which is part of composite object 301 in FIG. 3. Thus, role object 1201 also implements the ITwo interface 1220 and the IThree interface 1230. In addition, role object 1201 contains a data member m_id 1203, which contains the CLSID of the role object. Role object 1201 also contains a status flag m_attached 1204, which indicates the current attachment status of the role object. As shown in Table 6 below, the attachment status can be one of "never_attached," "currently_attached," and "previously_attached."

Table 6 lists a preferred IRole_Object interface. Each method is described in detail following the table.

TABLE 6

```
interface IRole_Object : public IBase_Object {
    enum attached_status
        {
                            never_attached
                            currently_attached,
                            previously_attached
        };
    virtual HRESULT     id (CLSID* clsid) = 0;
    virtual HRESULT     attached (attached_status* a) = 0;
    virtual HRESULT     attach (ICluster_Object* cluster) = 0;
    virtual RRESULT     detach (ICluster_Object* cluster) = 0;
}
```

IRole_Object::id

The "id" method returns the contents of the CLSID data member (m_id 1203), which represents the class identifier of the role object.

IRole_Object::attached

The "attached" method obtains the attachment status from the status flag (m_attached 1204).

IRole_Object::attach

The "attach" method of the base role object was described in detail above with reference to FIG. 11. Specifically, in steps 1115–1117 of FIG. 11, the attach method sets the status flag (m_attached 1204) to "currently_attached" and registers a property in the composite object which corresponds to the CLSID of the role object (stored in data member m_id 1203).

IRole_Object::detach

The "detach" method is called from the detach method of the cluster object to which the role object is attached when the composite object wishes to remove the role object from the composite object. After determining that the attachment status of the role object is "currently attached," the detach method calls the revoke_property method of the cluster object to revoke the property that corresponds to the CLSID of the role object. The detach method then changes the status flag (m_attached 1204) to the status "previously_attached."

Cluster_List Class

The cluster_list class provides an example implementation of a cluster list object. A cluster list object as described in the overview is a helper object that assists programmers in creating and maintaining access to the composite objects used in a simulation. For example, a cluster list helper object can be used to maintain a list of the current composite objects in a room in an adventure game. Cluster lists are used to initialize a looping construct to perform an operation on each composite object in a set or to multicast an event to a certain set of composite objects. Thus, a cluster list helper object enables a programmer to treat each composite object as a single object when the composite object is part of some collection. The technique of iterating over a list of composite objects to perform some set of operations is similar to the technique used to iterate over a set of role interfaces in a set of composite objects, as will be described below in detail with reference to a role list helper object.

Figure 13:
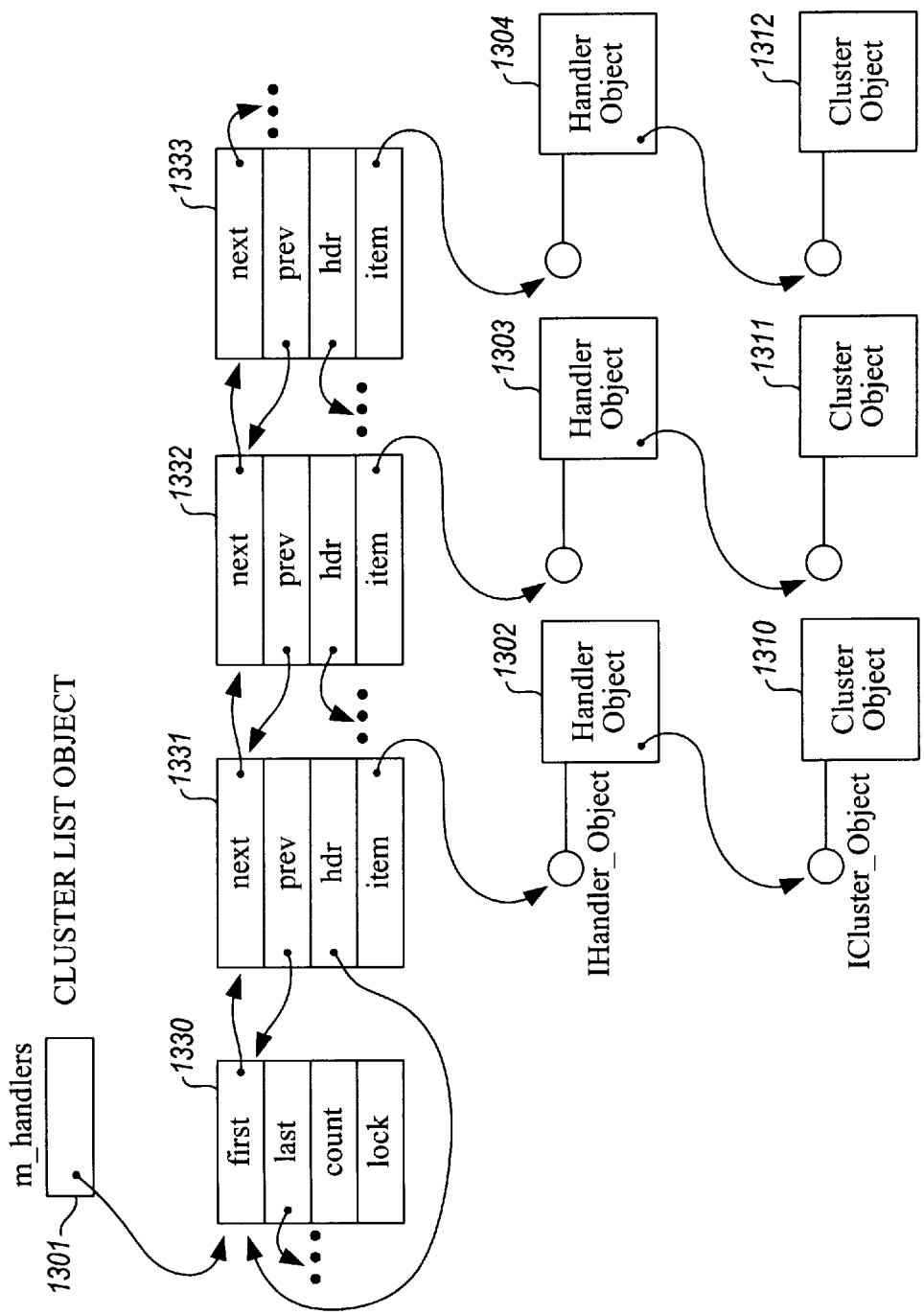
FIG. 13 is a block diagram of an example embodiment of a cluster list object.

FIG. 13 is a block diagram of an example embodiment of a cluster list object. In FIG. 13, the cluster list object contains a single data member, a handler pointer m_handlers 1301, which is a reference to a linked list of handler objects 1302, 1303, and 1304. These handler objects in turn contain references to their corresponding cluster objects 1310, 1311, and 1312, respectively. Thus, from a simulation programmer's perspective, the handler pointer m_handlers 1301 points to a list of cluster objects.

In the example embodiment shown in FIG. 13, the linked list indicated by handler pointer 1301 contains a list header 1330 and three list elements 1331, 1332, and 1333. The list header 1330 contains pointers to the first element in the list (1331), the last element in the list (1333), a count of the number of elements in the list, and a critical section lock for locking out access to the list (e.g., a semaphore). List elements 1331, 1332, and 1333 each contain a pointer to the next list element, a pointer to the previous list element, a pointer to the list header 1330, and a pointer to the item that is linked. In this case, the item that is linked is a handler object such as handler objects 1302, 1303, and 1304. As previously noted, one skilled in the art would recognize that any implementation of a variable length linked data structure could be used to implement the cluster list. For example, list header 1330 and each list element 1331, 1332, and 1333 may be implemented as objects having methods for accessing each of the mentioned fields.

A preferred embodiment of a cluster list object implements the methods listed in Table 7 below. Following the table, each method is described in detail.

Although Table 7 indicates that a cluster list object is a class that includes implementations of the various methods, one skilled in the art would recognize that an interface (e.g., ICluster_List) could also be provided which would support other implementations of the methods to be described. Also, in one embodiment, the cluster list object provides different flavors of its methods depending upon the type of parameter passed. Thus, a cluster list object could also be implemented as a C++ templated class. Although the description below notes when a method handles different types of parameters, it will be understood that additional implementations for other parameter types are possible.

TABLE 7

```
class Cluster_list
{
    //methods
    Cluster_list(void);
    Cluster_list(const ICluster_Object*);
    Cluster_list(const Cluster_list&);
    Cluster_list(REFGUID);
    ~Cluster_list(void);
    HRESULT      create(REFCLSID);
    HRESULT      create(const String&);
    HRESULT      attach(REFCLSID);
    HRESULT      attach(const String&);
    HRESULT      dispatch(const String&, const String&, const
                     String&, String*);
    HRESULT      dispatch(REFIID, const String&, const String&,
                     String*);
    Cluster_list&  operator =(const ICluster_Object*);
    Cluster_list   operator |(const ICluster_Object*);
    Cluster_list   operator -(const ICluster_Object*);
    Cluster_list   operator &(const ICluster_Object*);
    Cluster_list&  operator |=(const ICluster_Object*);
    Cluster_list&  operator -=(const ICluster_Object*);
    Cluster_list&  operator &=(const ICluster_Object*);
    Cluster_list&  operator =(const Cluster_list&);
    Cluster_list   operator |(const Cluster_list&);
    Cluster_list   operator -(const Cluster_list&);
    Cluster_list   operator &(const Cluster_list&);
    Cluster_list&  operator |=(const Cluster_list&);
    Cluster_list&  operator -=(const Cluster_list&);
    Cluster_list&  operator &=(const Cluster_list&);
    Cluster_list&  operator =(REFGUID);
    Cluster_list   operator |(REFGUID);
    Cluster_list   operator -(REFGUID);
    Cluster_list   operator &(REFGUID);
    Cluster_list&  operator |=(REFGUID);
    Cluster_list&  operator -=(REFGUID);
    Cluster_list&  operator &=(REFGUID);
    long       n(void);
    void       purge(void);
    void       append(IHandler_Object*);
    void       emove(IHandler_Object*);
}
```

Cluster_list::Cluster_list

The cluster_list constructor method constructs a cluster list object differently depending upon the type of input parameter. Specifically, when nothing is passed, the handler pointer (m_handlers 1301) is merely initialized. Alternatively, when a pointer to a cluster object is designated, the contents of the cluster list are set to point to the designated cluster object using the method "operator=" as described below. Alternatively, when a cluster list is designated, the constructor method sets the cluster list to the designated cluster list using the method "operator=" as described below. Alternately, when a property ID is designated, the constructor method sets the cluster list to all composite objects known to the producer object to contain that property ID using the method "operator=."

Cluster_list::~Cluster_list

The destructor method destroys the list.

Cluster_list::create

The "create" method creates a composite object and a cluster list that is set to the newly created composite object. Specifically, if a CLSID is designated by the input parameter, then the create method requests the associated producer object to load the code corresponding to the designated CLSID. If the loaded code belongs to a cluster object, then the cluster object is instantiated and the contents of the cluster list are set to the newly instantiated cluster object using the method "operator=."

If, instead, a string is designated by the input parameter, then the create method determines a CLSID from the designated string and reinvokes the create method with the determined CLSID.

Cluster_list::attach

The "attach" method attaches a role object corresponding to the designated CLSID to each of the cluster objects on the cluster list (m_handlers 1301). Specifically, for each element in the cluster list, the attach method locates and retrieves the pointer to the cluster object (e.g., cluster object 1310), loads and instantiates the role object corresponding to the designated CLSID, and invokes the attach method of the retrieved pointer to the cluster object passing it the newly created role object. A preferred implementation first locks the cluster list before this operation is performed and unlocks it after the operation is complete.

If the input parameter to the attach method instead designates a string, the string is first translated into a CLSID (of the role object to create) and the attach method is reinvoked with this newly determined CLSID.

Cluster_list::dispatch

The "dispatch" method is used to invoke all of the roles of each composite object referenced by the cluster list (m_handlers 1301) that correspond to a designated interface ID. If instead of an interface ID, a string is designated as the input parameter, then the dispatch method first translates the string into an interface ID and then reinvokes the dispatch method with this newly created interface ID.

Accordingly, the dispatch method provides a mechanism for treating composite objects as single objects. Also, using the dispatch method, a cluster list helper object can be used to easily multicast an event (through a method call) to all of the role interfaces in a composite object or a set of composite objects that correspond to a particular interface ID.

In a preferred implementation of the dispatch method, the method first creates a list of roles corresponding to the designated interface ID by creating a role list helper object. An example syntax of pseudocode used to create such a list is as follows:

Role_list<IInvoke>roles (role_iid);
roles=*this;

The syntax above indicates, as will be discussed below, that a role list object is preferably a templated C++ class. The first line indicates that a new variable "roles" will be created, which points to a role list object that corresponds to the designated interface ID "role_iid." This line also indicates that the interface pointer, which will be stored in each role list element to indicate a role interface, is a pointer to the IInvoke interface. The second line indicates that the newly created role list should be set to all of the role interfaces contained in all of composite objects of the current cluster list (regardless of whether they are part of a cluster object or a role object that corresponds to the designated interface ID "role_iid." This setting of the role list is performed by calling the method "operator=" of a role list object with a parameter that designates the current cluster list. This operation is discussed below in conjunction with a role list object.

Once the dispatch method has created a role list, the method can then easily iterate over all the members of the role list to call the invoke method of each of the role interfaces with the designated method name and parameters. The dispatch method then returns a return code, which is a composition of the return codes returned by the invoke method of each role interface in the role list.

Cluster_list::operator=

In a preferred embodiment, the operator "=" is "overloaded" to perform specialized functions for helper objects. The method that corresponds to the operator "=" sets the cluster list (m_handlers 1301) to contain a pointer to one or more cluster objects depending upon the type designated by the input parameter. In particular, if a pointer to a single cluster object is designated, then the operator "=" clears the current cluster list and appends a new list element onto the cluster list, which points to the associated handler object of the designated cluster object. The handler object of the designated cluster object is retrieved by invoking the handler method of the designated cluster object.

If, alternatively, another cluster list object is designated, then, the elements of the designated cluster list object are copied to corresponding newly created elements of the current cluster list. Accordingly, each new element in the current cluster list is set to point to the same handler as the corresponding list element of the designated cluster list.

Figure 14:
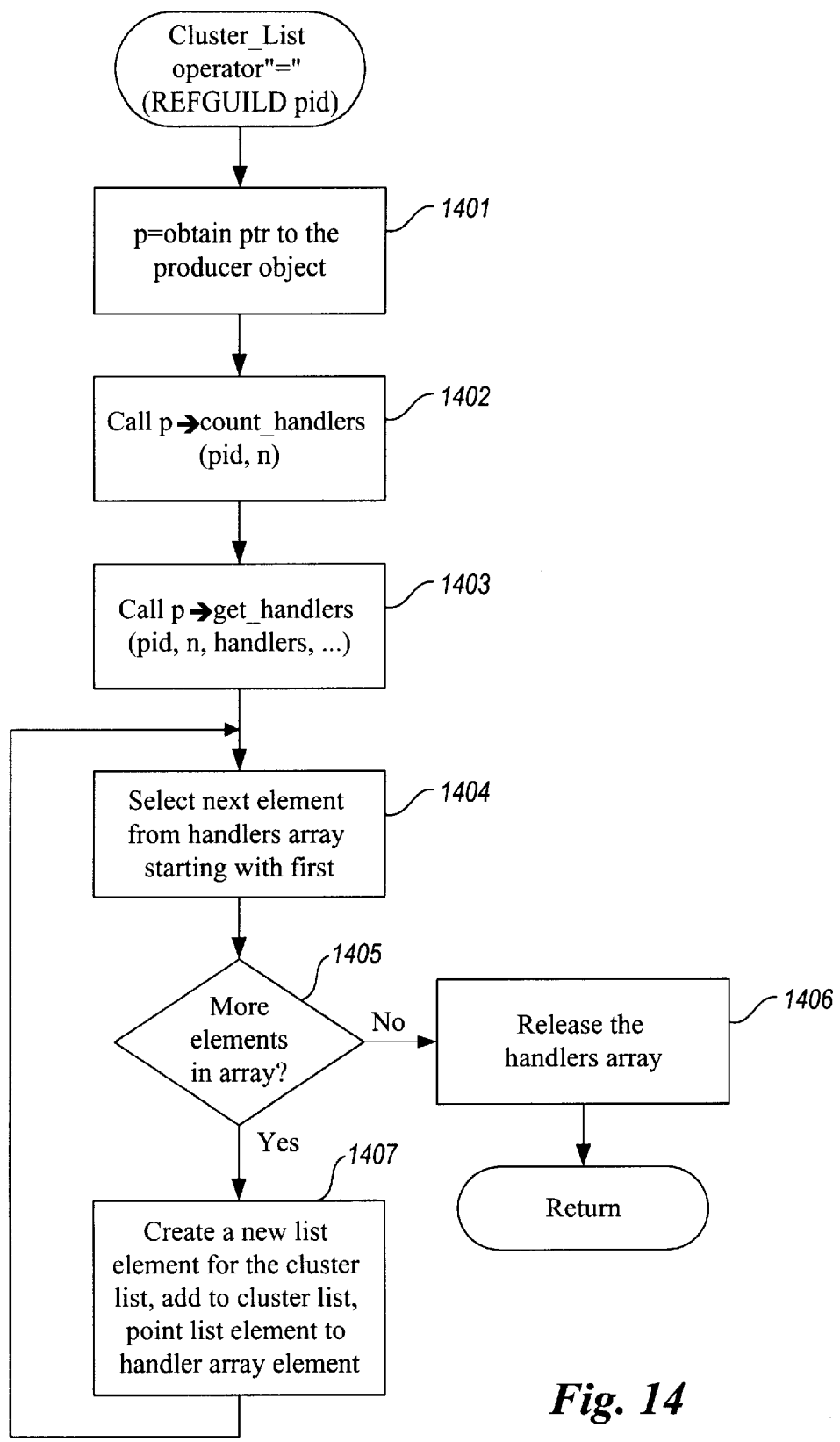
FIG. 14 is a flow diagram of an example implementation of the operator "=" of a cluster list object for a designated property identifier.

If, alternatively, a property ID is designated by the input parameter, then the cluster list is set to point to all composite objects known by the associated producer object to contain the designated property ID. FIG. 14 is a flow diagram of an example implementation of the operator "=" of a cluster list object for a designated property identifier. When a property ID is designated, in steps 1401–1403 the operator "=" searches for all of the composite objects known by the associated producer object to contain the property that corresponds to the designated property ID. The producer object uses its property list (for example property list 803 in FIG. 8) to obtain and return an array of handler objects. Specifically, in step 1401, the method obtains a pointer to the producer object that is associated with this cluster list object. (Recall that preferably a global pointer to the appropriate producer object is stored.) In step 1402, the operator "=" invokes the count_handlers method of the producer object to retrieve a count of the number of composite objects contained on the cluster list corresponding to the designated property ID. (See, for example, the count field of list header 807 of cluster list 806 in FIG. 8.) Once the number of handlers is known, in step 1403, the method calls the Get_Handlers method of the producer object passing an array (of the determined size), which can contain pointers to handler objects. Recall that, for RPC purposes, it is necessary to use a fixed size array to pass pointers to handler objects and thus the count_handlers method is invoked first.

In steps 1404–1407, the method iterates over the elements of the retrieved array of handler objects and creates and adds to the cluster list a new list element corresponding to each handler object. Specifically, in step 1404, the method selects the next element from the array of handler objects beginning with the first element. In step 1405, the method determines whether there are any more elements in the array, and if not, releases the array in step 1406, otherwise continues in step 1407. In step 1407, the method creates a new list element to insert into the cluster list and sets the element to point to the IHandler_Object interface indicated by the current array element. Then the method returns to the beginning of the loop at step 1404.

Cluster_list::operator &=and ::operator&

The operator "&=" (also provided by the operator "&") determines which composite objects are both designated by the input parameter and presently referenced by the cluster list and sets the cluster list to refer to these determined composite objects. Thus, the operator "&=" and "&" provide a logical "AND" operation.

Cluster_list::operator |=and ::operator|

The operator "|=" (also provided by the operator "|") appends all of the composite objects designated by the input parameter (a cluster object, a cluster list, or a property ID) to the composite objects already referenced by the cluster list. Duplicates of composite objects already referenced by the cluster list are ignored. Thus, the operator "|" and "|" provide a logical "OR" operation.

Cluster_list::operator "-=" and ::operator "-"

The operator "-=" (also provided by operator "-") removes one or more composite objects designated by the input parameter. That is, if the input parameter designates a cluster list, then all of the composite objects referenced by the designated cluster list are removed from the current cluster list object. Similarly, if the input parameter designates a single cluster object, then the cluster list element that corresponds to the designated cluster object is located and removed from the cluster list. Similarly, if the input parameter designates a property ID, then a cluster list object is created for the designated property ID and the operator "-" of the cluster list is reinvoked passing the newly created cluster list. All of the operators respond to a designated property ID in a fashion similar to that shown for operator "=" in FIG. 14.

Role_List Class

A role list helper object is a list of pointers to role interfaces (present in role objects or cluster objects) that correspond to an interface ID designated during instantiation of the role list object. In a preferred embodiment, the role list helper object is defined as a templated C++ class in which a property ID is passed as the class type to the constructor for the templated class. Details of C++ template classes are described in Bjarne Stroustrup, *The C++ Programming Language, Second Edition*, Addison-Wesley, 1991, which is hereby incorporated by reference.

A typical use of a role list helper object is to bracket some active use of a set of composite objects. For example, in the implementation of many of the methods described thus far, role lists are created for a set of composite objects in order to iteratively perform some operation for a role interface, which may be present in one or more of the component objects of each composite object in the set.

Figure 15:
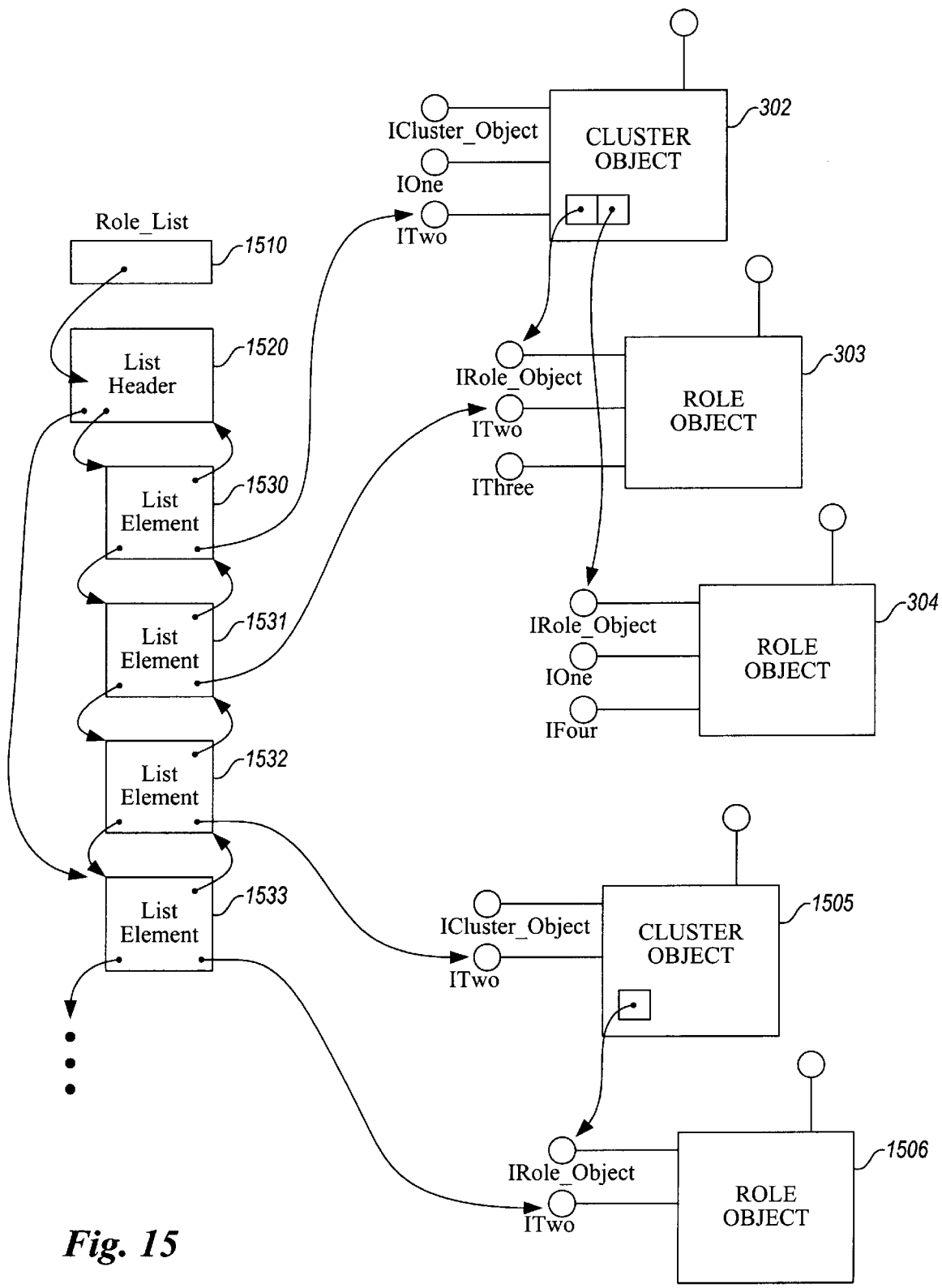
FIG. 15 is a block diagram of an example use of a role list helper object.

FIG. 15 is a block diagram of an example use of a role list helper object. In FIG. 15, the cluster object 302 and role objects 303 and 304 correspond to the objects of composite object 301 in FIG. 3. Of these objects, two of the objects, cluster object 302 and role object 303 provide an implementation of the ITwo interface. Or, more precisely, they provide an implementation of an interface which corresponds to the IID_ITwo interface identifier. Cluster object 1505 and role object 1506 belong to a second composite object in the example shown. Of these objects, cluster object 1505 and role object 1506 both contain an implementation of the ITwo interface. Therefore, if a client program wishes to send an event to all role interfaces that correspond to the interface identifier IID_ITwo of the cluster set comprising these two composite objects, then the role list 1510 would be constructed as shown.

Although a more detailed description of the structures in an example embodiment of a role list is described with reference to FIG. 16, role list 1510 demonstrates the conceptual model of a role list. Role list 1510 contains a list header 1520 and four list elements 1530, 1531, 1532, and 1533, each of which correspond to an implementation of an interface that corresponds to interface identifier IID_ITwo. For example, list element 1530 refers to the ITwo interface of cluster object 302. Similarly, list element 1533 refers to the ITwo interface of role object 1506.

The use of role list objects enables a client program to ignore the implementation details of the objects that comprise a particular composite object and to instead concentrate on sending events and receiving information from the one or more instances of a particular role interface in which the client is interested.

Pseudo-Code Table 1

```
1  {
2      Role_list <IWalk> R(IID_IWalk);
3      R=C;  // creates a role list containing all
4              // roles of composite object C that correspond
5              // to IID_IWalk
6      for (L=R.First(); L!=null; L=L→Next())
7      {
8              // do some action on each role
9                  L→role()→step_forward();
10             // e.g., call the step_forward method of the IWalk
                // interface
11     }
12 {
```

Pseudo-Code Table 1 provides an example pseudo-code syntax for using a role list object to perform some operation iteratively on all of the interfaces of a composite object that correspond to a particular interface identifier. The example pseudo-code assumes an implementation where the role list contains objects for each list element, which define methods for retrieving the various list element data. (See detailed method descriptions below.)

In this case, a role list object is created for the interface identifier "IID_IWalk." In line 1, an instance of a role list object is created by passing the interface identifier "IID-IWalk" to the constructor method of the role list object. An empty role list corresponding to this interface identifier is allocated. In line 3, using the operator "=" a role list object is created, which contains elements pointing to all of the roles of composite object C that correspond to the interface id "IID_IWalk." The operator "=" is analogous to the operator "=" of a cluster list object, and is discussed further below. In line 6, a loop construct syntax (which corresponds to whatever implementation is used to implement the linked list) is shown that sets "L" to the next element in the list starting with the first element in the role list, until "L" becomes null. (A standard "FOR-loop" procedure is used in the example above.) Then, for each list element, lines 8–10 indicate that some action is performed on the role interface pointed to by the list element. For example, in line 9, the step forward method of the IWalk interface is invoked.

Figure 16:
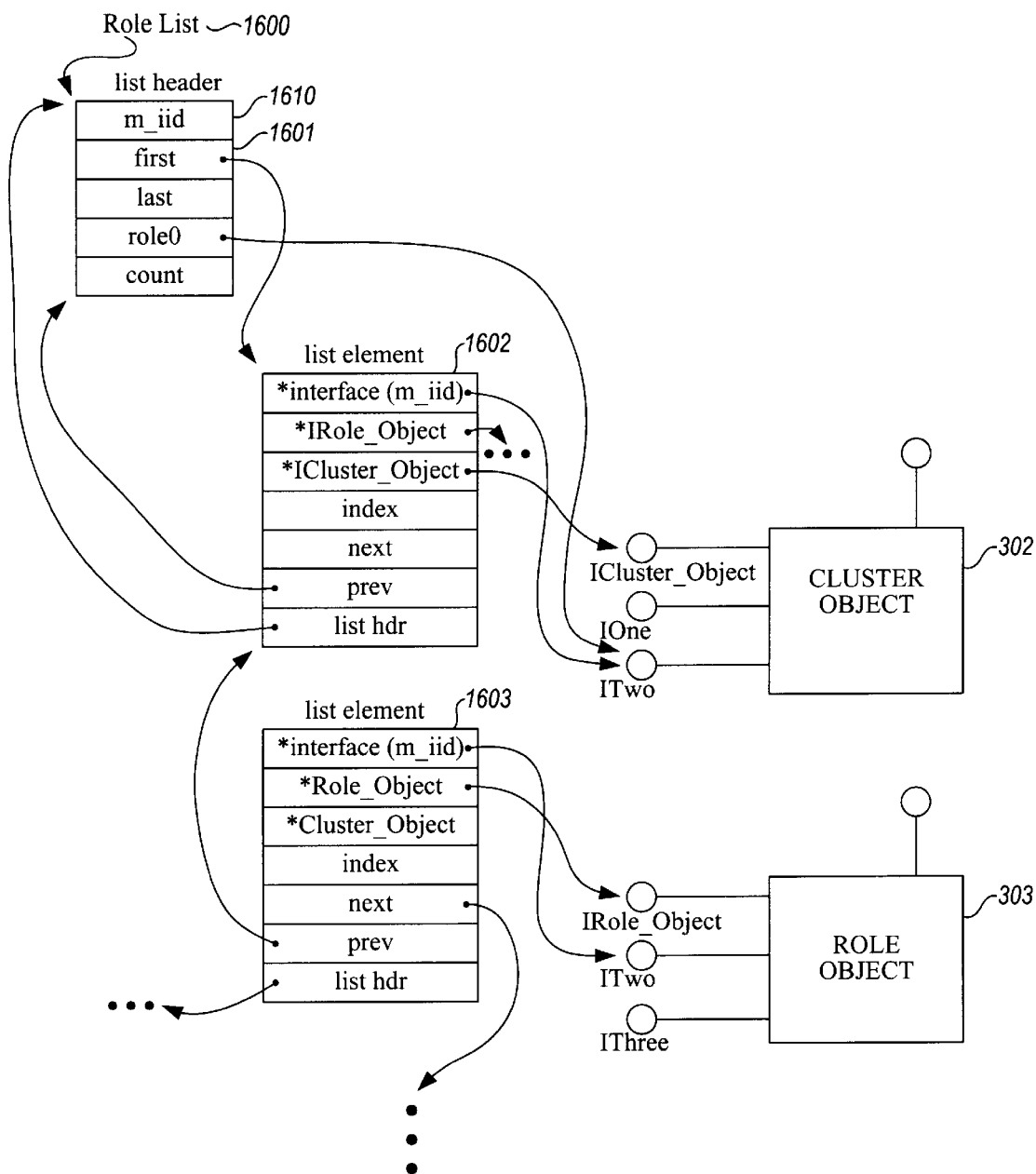
FIG. 16 is a block diagram of an example implementation of a role list helper object.

FIG. 16 is a block diagram of an example embodiment of a role list helper object. Role list 1600 is comprised of a list header 1601 and one or more list elements. The role list 1600 is a role list created to correspond to the interface ID stored in the list header as field m_iid 1610. Role list 1600 corresponds to the role list 1510 shown in FIG. 15. However, only two of the list elements 1602 and 1603, which correspond to list elements 1530 and 1531, are shown in FIG. 16. In the example shown in FIG. 15, the interface ID for role list 1600 corresponds to the "IID_ITwo" interface ID.

The role list header 1601 contains several fields other than the interface ID for the list. The role0 field of list header 1601 is a convenient pointer to the first interface available. The list header 1601 also contains the standard fields, which include a pointer to the first list element, a pointer to the last list element, and a count of the number of list elements.

Each list element, for example list element 1602, contains a pointer to the interface that corresponds to the interface ID of the role list (m_iid 1610), a pointer to the IRole_Object interface of the associated role object if the interface referred to belongs to a role object, and a pointer to the ICluster_Object interface. In addition, each list element contains an index into the role list structure, which is a token that uniquely identifies the interface. (An interface pointer is not sufficient to indicate a unique interface because there can be more than one interface of the same type in a composite object). The index item is used, for example, in calls to the disable_role and enable_role methods of the associated cluster object. Each list element also contains a pointer to the next list element, a pointer to the previous list element, and a pointer to the list header.

One skilled in the art will recognize that the role list object, as with the other linked lists of the preferred clustering mechanism, can be implemented using any suitable well-known technique. For example, each list header and each list element can be implemented as objects, with methods to retrieve each item described.

A preferred embodiment of a role list object implements the methods listed in Table 8 below. Each method is described in detail following the table.

TABLE 8 template<class T> class Role_list
{
    //methods
    Role_list (REFIID        iid);
    Role_list (const         Role_list<T>&);
    HRESULT                  search(void);
    Role_list<T>&            operator =(const Cluster_list&);
    Role_list<T>&            operator =(ICluster_Object*);
    Role_list<T>&            operator =(const Role_list<T>&);
    HRESULT                  purge(void);
    HRESULT                  kill(void);
    HRESULT                  suspend(void);
    Role_list<T>*            first(void);
    Role_list<T>*            last(void);
    T*                       role0(void);
    Role_list<T>*            next(void);
    Role_list<T>*            prev(void);
    T*                       role(void);
    IRole_Object*            role_object(void);
    ICluster_Object*         cluster(void);
    DWORD*                   index(void);
    HRESULT                  lock(void);
    HRESULT                  unlock(void);
    DWORD*                   count(void);
}

Role_list::Role_list

The constructor method for a role list object creates an empty role list similar to that shown in FIG. 16. The interface ID stored in the data member m_iid 1610 is set to the interface ID designated by the input parameter to the constructor method. Alternatively, if a pointer to a role list is designated by the input parameter, then the new role list is created to correspond to the interface ID of the designated role list.

Role_list::search

The "search" method sets the role list to contain pointers to all roles that correspond to the interface identifier data member (m_iid 1610) from all composite objects known by the associated producer object. In one embodiment, a cluster list is created using the operator "=" of a cluster list object designating the interface ID as a property ID. Further details are provided in the description of the operator "=" in the cluster list object methods.

Role_list::operator "="

The operator "=" of a role list is a complex assignment operation defined similar to the operation "=" of a cluster list object. This method performs slightly different tasks depending upon the type designated by the input parameter. In the first case, if a pointer to a cluster list is designated, then the role list is set to point to all of the interfaces of all composite objects in the designated cluster list that correspond to the interface ID stored in the interface identifier data member (m_iid 1610) of the role list. This task is accomplished by essentially traversing each element in the cluster list to retrieve the pointer to the cluster object from the handler object referenced by the list element. Then for each retrieved cluster object pointer, an entry in the role cache indexed by interface identifier (e.g., m_roles 1003 in FIG. 10) is retrieved to obtain the list of interfaces in that composite object that correspond to the designated interface ID. As a side effect, any handler objects to dead composite objects will be removed from the designated cluster list.

Alternatively, in the second case, if a pointer to a cluster object is designated by the input parameter, then the role list is set to all of the interfaces of the designated cluster object that correspond to the interface ID associated with the role list, e.g., m_iid 1610. The mechanism for retrieving this information is analogous to that described with respect to a cluster list object, except that it is only performed on a single cluster object.

In the third case, if a second role list is designated by the input parameter, then each element of the designated role list is copied to a corresponding element of the current role list.

Role_list::purge

The "purge" method removes all role list elements from the role list.

Role_list::first

The "first" method returns a pointer to the first list element in the role list.

Role_list::last

The "last" method returns a pointer to the last list element in the role list.

Role_list::role0

The "role0" method returns the interface pointer pointed to by the first list element, for example, list element 1602, in the role list. For example, in FIG. 16, the role0 method would return a pointer to the ITwo interface of cluster object 302.

Role_list::count

The count method returns the number of roles contained in the role list.

In one embodiment of a role list object there are several methods of a base object from which the role_list class is derived, which operate on each list element of the role list. These methods are described in the following text as methods that operate on the "current" list element.

Role_list::lock

The lock method enables a client to enter a critical section with respect to the cluster object and role object referred to by the current list element.

Role_list::unlock

The unlock method enables a client to leave a critical section with respect to the cluster object and role object referred to by the current list element.

Role_list::kill

The "kill" method invokes the kill method of the cluster object that provides the role indicated by the current list element.

Role_list::suspend

The "suspend" method causes the cluster object that provides the role indicated by the current list element to be suspended. It invokes the suspend method of that cluster object.

Role_list::role

The "role" method returns the interface pointer corresponding to the current list element's role. This interface pointer corresponds to the interface identifier stored in the list header for the role list (e.g., m_iid 1610).

Role_list::role_object

The "role_object" method returns a pointer to the IRole_Object interface of the role object that provides the role indicated by the current list element. This method returns null if the role is part of a cluster object and not part of an attached role object. (See, for example, list element 1602 in FIG. 16.)

Role_list::cluster

The "cluster" method returns a pointer to the ICluster_Object interface of the cluster object that provides the role indicated by the current list element. In the case of role interface that is part of an attached role object, a pointer to the associated cluster object is available when the list element is created.

Role_list::next and Role_list::prev

The "next" method and "prev" method return a pointer to the next and previous list elements in the role list, respectively.

Creating Custom Composite Objects

All of the interfaces, classes, and methods described in the previous section can be used to create custom composite objects. Custom composite objects are created in several ways. First, a custom composite object can be created by creating a custom cluster object, which includes roles for the particular application in question. Second, a custom composite object can be created using an existing cluster object by creating and attaching custom role objects to the existing cluster object. Third, a custom composite object can be created by any combination of creating and using custom cluster objects and role objects with existing cluster objects and role objects.

Figure 17:
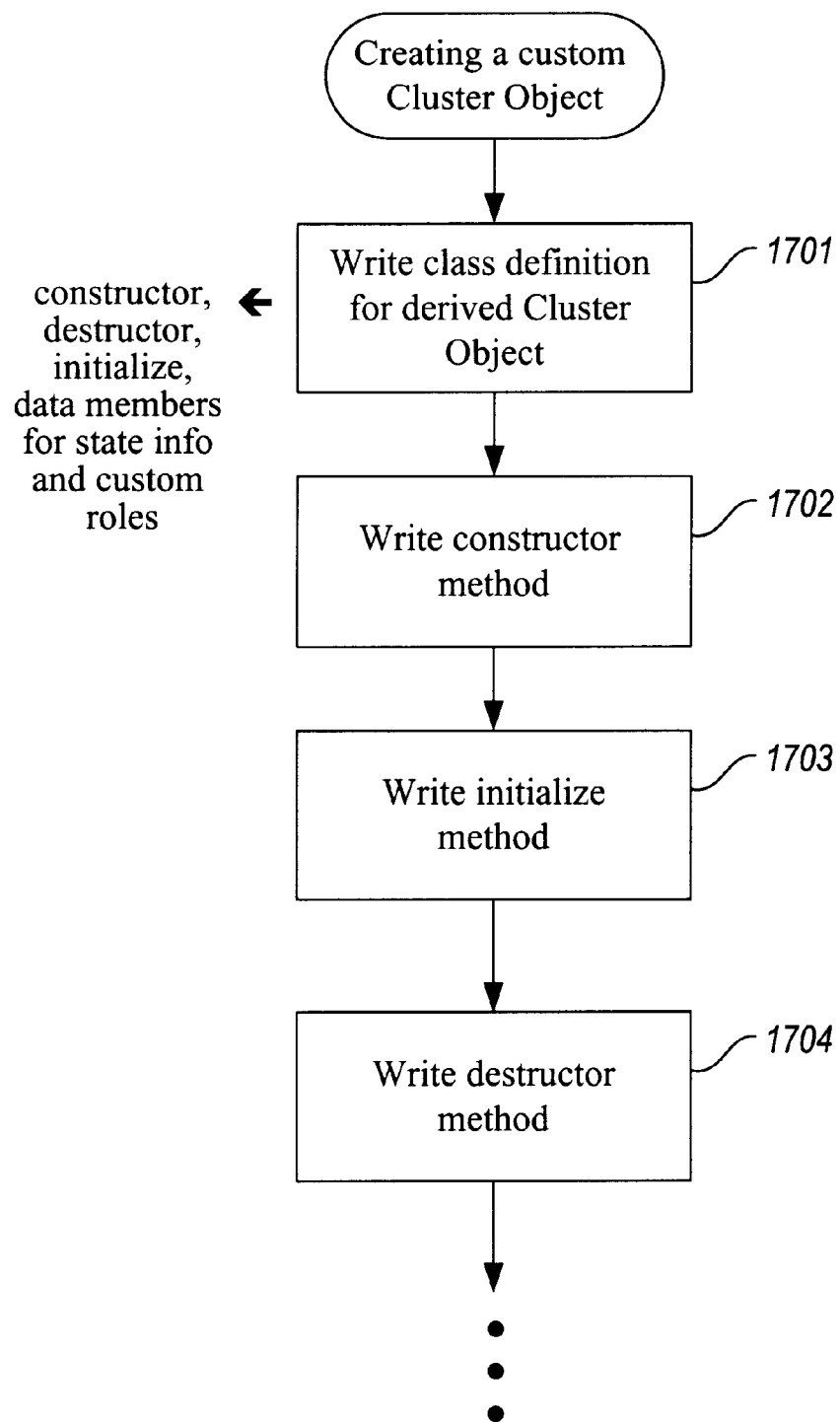
FIG. 17 is a flow diagram of example steps for creating a custom cluster object.

FIG. 17 is a flow diagram of example steps for creating a custom cluster object. In step 1701, the programmer writes a class definition for a cluster object, which is derived from a base cluster object such as the cluster object discussed with reference to FIG. 10. The class definition preferably includes a declaration for a constructor method, a destructor method, and an initialize method. Further, data members are preferably defined for state information for the derived cluster object and for defining any custom roles (interfaces) that are to be included as part of the cluster object itself. In step 1702, the programmer writes the constructor method of the derived cluster object. In step 1703, the programmer writes an initialize method for the derived cluster object. An example initialize method is discussed below with reference to FIG. 18. In step 1704, the programmer writes a destructor method for the derived cluster object. Most of the destruction of the data structures allocated for the derived cluster object is preferably performed in the destructor method of the base cluster object.

Figure 18:
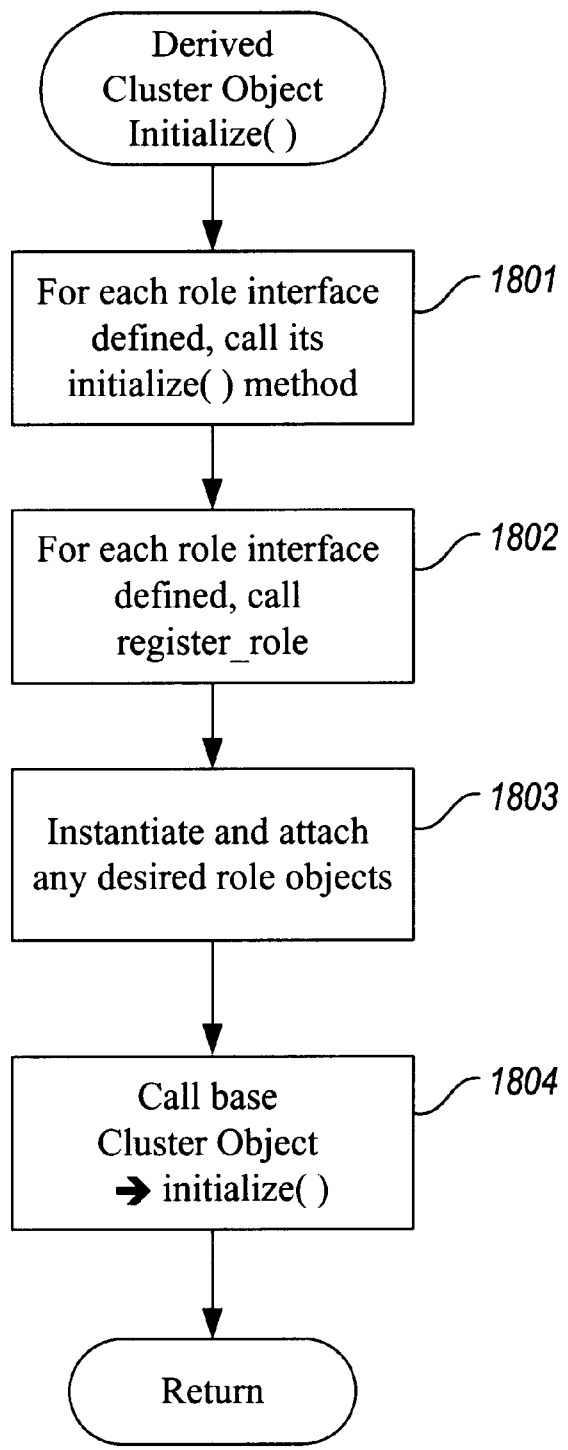
FIG. 18 is a flow diagram of an example initialize method of a derived cluster object.

FIG. 18 is a flow diagram of an example initialize method of a derived cluster object. In step 1801, the method calls the initialize method of each role interface defined by the derived cluster object. In step 1802, the initialize method calls the base cluster object's register_role method to register each role interface defined by the derived cluster object in order to make that role interface accessible to the base cluster object's QueryInterface method. In step 1803, the initialize method instantiates and attaches any desired role objects. One possible implementation of the step creates a cluster list object that corresponds to the derived cluster object and then calls the attach method of the cluster list object designating the CLSID of the role object to be created and attached. In step 1804, the initialize method calls the initialize method of the base cluster object, and then returns.

Figure 19:
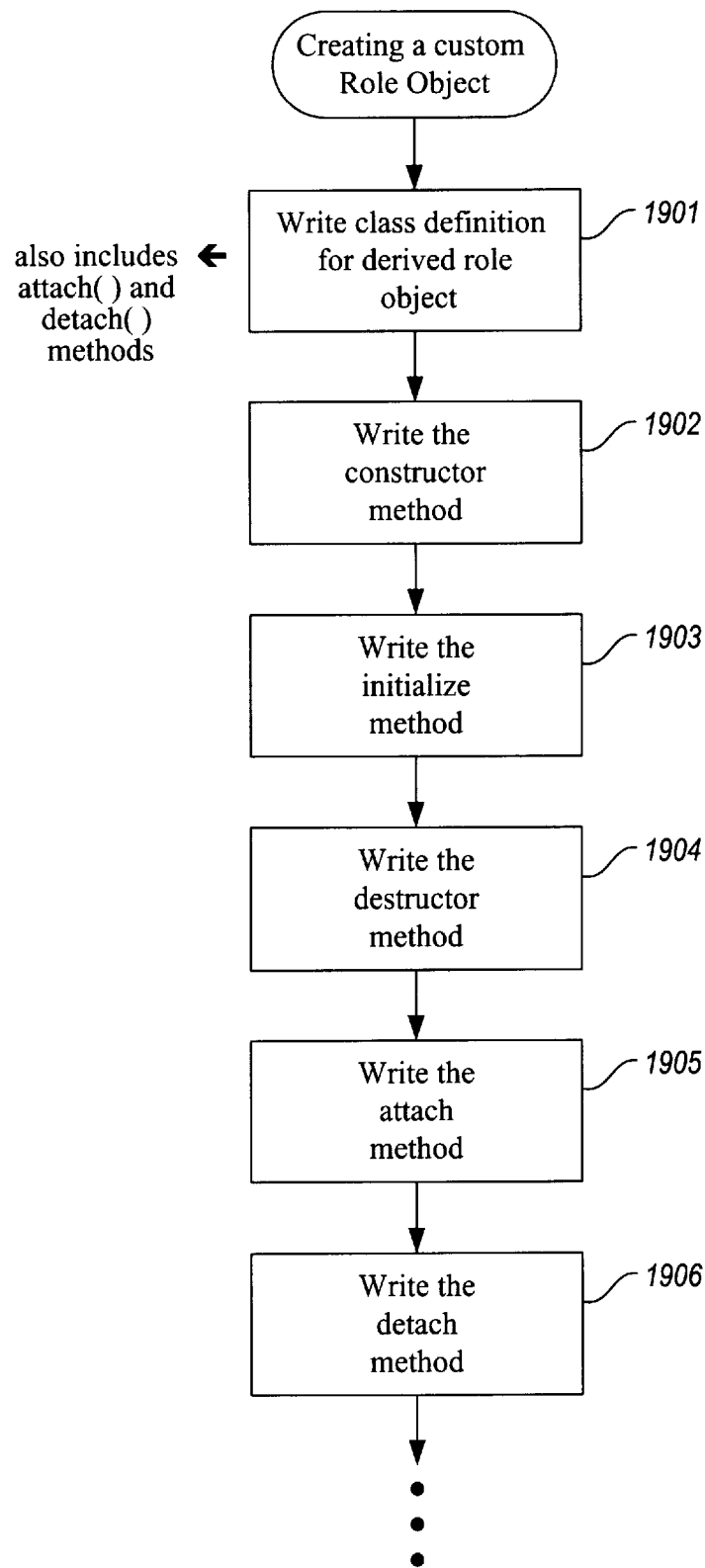
FIG. 19 is a flow diagram of the example steps for creating a custom role object.

FIG. 19 is a flow diagram of the example steps for creating a custom role object. In step 1901, the programmer writes a class definition for the derived role object. This definition is analogous to the definition for the derived cluster object discussed with reference to FIG. 18, with the addition of attach and detach methods. In step 1902, the programmer writes the constructor method for the derived role object. In step 1903, the programmer writes the initialize method for the derived role object. This initialize method is called in step 1801 of FIG. 18 by the derived cluster object in order to initialize the role object before it is attached to the composite object. An example initialize method for a derived role object is discussed below with reference to FIG. 20. In step 1904, the programmer writes the destructor method for the derived role object. In a typical case, the destructor method of the base role object performs all necessary operations. In step 1905, the programmer writes the attach method of the derived role object. An example attach method is discussed below with reference to FIG. 21. In step 1906, the programmer writes the detach method. In a typical case, the detach method of the base role object provides any needed operations.

Figure 20:
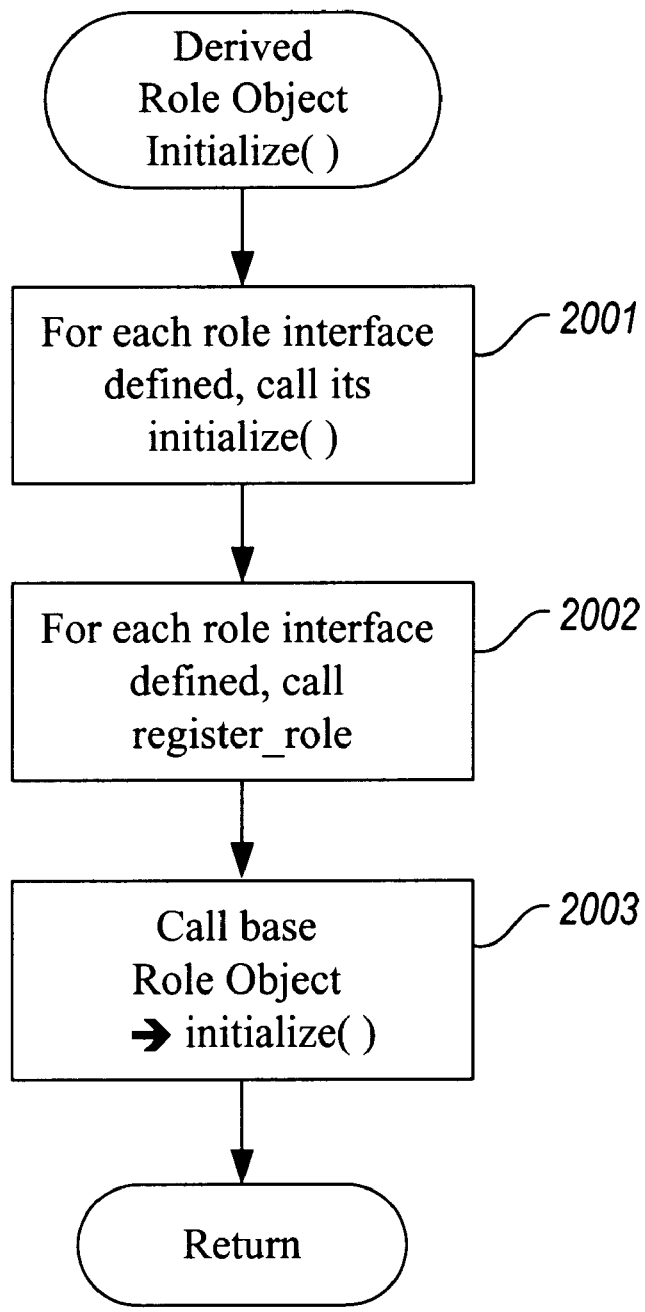
FIG. 20 is a flow diagram of an example initialize method of a derived role object.

FIG. 20 is a flow diagram of an example initialize method of a derived role object. In step 2001, the method calls the initialize method of each role interface defined by the derived role object. In step 2002, the method calls the register_role method of the base role object to register each role interface defined by the derived role object to make that role accessible to the QueryInterface method of the base role object. In step 2003, the method calls the initialize method of the base role object and then returns.

Figure 21:
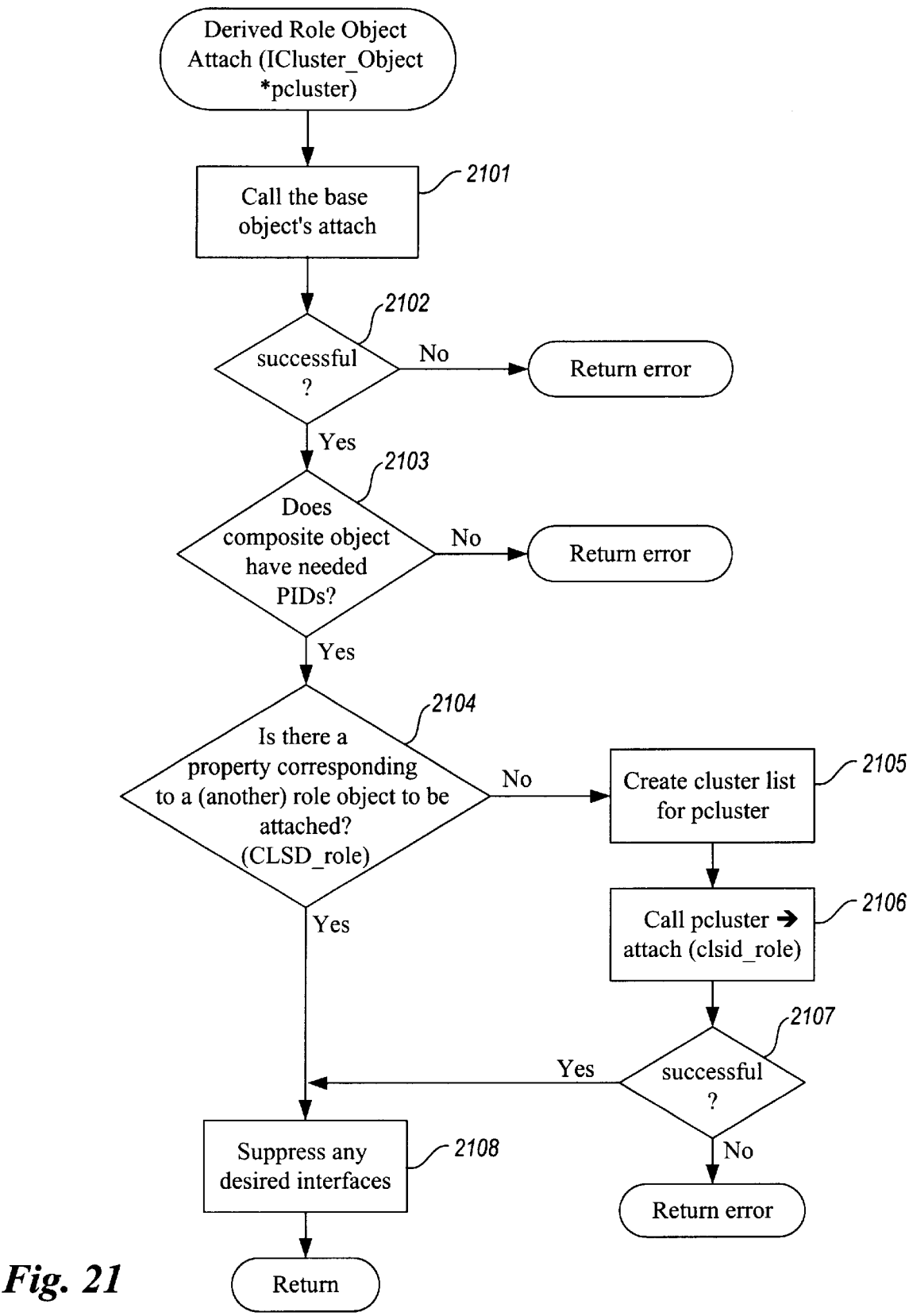
FIG. 21 is a flow diagram of an example attach method for a derived role object.

FIG. 21 is a flow diagram of an example attach method for a derived role object. A basic attach method for a derived role object was described above with reference to FIG. 11 (see steps 1111–1114). The steps identified in FIG. 21 correspond to steps 1111 and 1112 of FIG. 11, but are presented in more detail. One skilled in the art will recognize that many other implementations of an attach method can be realized.

Specifically, in step 2101, the attach method calls the attach method of the base role object. In step 2102, the method determines whether it has been successful (the base role object agreed to attach) and if so continues in step 2103, else returns an error. In step 2103, the attach method determines whether the composite object has the needed properties, and if so, continues in step 2104, otherwise returns an error. In step 2104, the method determines whether there already exists a property of the composite object that corresponds to an additional role object the derived role object wishes to attach. If such a property exists, then there is no need to create and attach this additional role object, thus the method continues in step 2108. Otherwise, the method continues in step 2105 and creates a cluster list object that corresponds to the designated cluster object. In step 2106, the method calls the attach method of the newly created cluster list object passing it the CLSID of the role object to be attached. This step results in attaching the additional role object to the composite object. In step 2107, the method determines whether it has been successful so far, and if not returns an error, otherwise continues in step 2108. In step 2108, the attach method suppresses any desired interfaces of the composite object, and then returns.

In addition to writing the derived cluster object and the derived role object, the programmer needs to write all of the interfaces corresponding to the role interfaces to be included in the composite object. In an OLE environment, these interfaces are written as an interface definition and an implementation according to well-known methods. In addition, for any interface that is intended to be passed in an RPC call, the programmer needs to provide proxy routines. These proxy routines are provided using well-known mechanisms in an OLE environment. In addition, if the programmer desires for remote processes to create any of the custom cluster objects or role objects, then the programmer needs to create and register class factory objects using standard OLE mechanisms.

Although the present invention has been described in term of preferred embodiments, it is not intended that the invention be limited to these embodiments. Equivalent methods, structures, processes, steps, and other modifications within the spirit of the invention fall within the scope of the invention. The scope of the present invention is defined by the claims which follow.

What is claimed is:

1. A method in a computer system for determining whether a behavior represented by a role object in memory should be dynamically associated to a simulated entity represented by a cluster object in memory, comprising:

at the cluster object, invoking a function thereof to pass the role object thereto;

at the cluster object, under control of the function invoked, determining by the cluster object as to whether the behavior represented by the passed role object should be associated to the simulated entity;

at the role object, invoking a function thereof, such that under control of the function invoked, determining by the role object as to whether the behavior represented by the role object should be associated to the simulated entity;

ONLY after so determining, BOTH by the cluster object AND by the role object, indicating that the behavior represented by the passed role object should be associated to the simulated entity.

2. The method of claim 1, further comprising associating the behavior represented by the passed role object by storing within the cluster object a reference to the role object.

3. The method of claim 1 wherein the determination of whether the behavior represented by the passed role object should be associated to the simulated entity is based on characteristics of the cluster object.

4. The method of claim 1 wherein the determination of whether the behavior represented by the passed role object should be associated to the simulated entity is based on characteristics of both the cluster object and the role object.

5. A method in a computer system for dynamically managing behaviors of an interactive simulated entity represented in a memory of the computer system, performed by a cluster object representing the interactive simulated entity, the method comprising:

receiving a request identifying a requested behavior to be added to the interactive simulated entity;

in response to receiving the request, determining whether the requested behavior should be added to the interactive simulated entity; and only where it is determined that the requested behavior should be added, adding the requested behavior to the interactive simulated entity.

6. The method of claim 5 wherein the requested behavior is implemented as part of a role object, and wherein the determining is also performed by the role object.

7. The method of claim 5 wherein the determination of whether the requested behavior should be added to the interactive simulated entity involves:

identifying a second behavior distinct from the requested behavior; and attempting to add the second behavior to the interactive simulated entity; and determining that the requested behavior should be added to the interactive simulated entity only where the second behavior is successfully added to the interactive simulated entity.

8. The method of claim 5, further comprising:

removing the identified behavior from the interactive simulated entity, such that any attempt to invoke the identified behavior in the interactive simulated entity occurring after such removal fails.

9. The method of claim 7 wherein the requested behavior is implemented as part of a role object, and wherein the determination is also made by the role object.

10. A computer-readable medium having instructions stored thereon for performing a method within a computer system to dynamically manage behaviors of an interactive simulated entity represented in a memory of the computer system, the method performed by a cluster object representing the interactive simulated entity and comprising:

receiving a request identifying a requested behavior to be added to the interactive simulated entity;

in response to receiving the request, determining whether the identified behavior should be added to the interactive simulated entity; and only where it is determined that the identified behavior should be added, adding the identified behavior to the interactive simulated entity.

11. The computer-readable medium of claim 10 wherein the identified behavior is implemented as part of a role object, and wherein the determining is also performed by the role object.

12. The computer-readable medium of claim 10 wherein determining whether the identified behavior should be added to the interactive simulated entity comprises:

identifying a second behavior;

attempting to add the second behavior to the interactive simulated entity; and determining that the identified behavior should be added to the interactive simulated entity only where the second behavior is successfully added to the interactive simulated entity.

13. The computer-readable medium of claim 10 wherein the method further comprises:

removing the identified behavior from the interactive simulated entity, such that any attempt to invoke the identified behavior in the interactive simulated entity occurring after such removal fails.

14. The computer-readable medium of claim 12 wherein the identified behavior is implemented as part of a role object, and wherein the determination is also made by the role object.

* * * * *